US012760576B2

(12) United States Patent
Rogers et al.

(10) Patent No.: US 12,760,576 B2
(45) Date of Patent: Oct. 13, 2026

(54) CLOSING MECHANISM

(71) Applicant: TOTAL HARDWARE PTY LTD, Canning Vale (AU)

(72) Inventors: Benjamin Colin Rogers, Canning Vale (AU); William Thorpe, Canning Vale (AU)

(73) Assignee: Total Hardware Pty Ltd, Canning Vale (AU)

( * ) Notice: Subject to any disclaimer, the term of this patent is extended or adjusted under 35 U.S.C. 154(b) by 40 days.

(21) Appl. No.: 19/104,604

(22) PCT Filed: Aug. 21, 2023

(86) PCT No.: PCT/AU2023/050792
§ 371 (c)(1),
(2) Date: Feb. 18, 2025

(87) PCT Pub. No.: WO2024/036383
PCT Pub. Date: Feb. 22, 2024

(65) Prior Publication Data
US 2026/0062974 A1 Mar. 5, 2026

(30) Foreign Application Priority Data
Aug. 19, 2022 (AU) ................................ 2022902373

(51) Int. Cl.
*E05F 1/10* (2006.01)
*E05F 1/16* (2006.01)
(Continued)

(52) U.S. Cl.
CPC ................ *E05F 1/16* (2013.01); *E05F 5/003* (2013.01); *E05F 5/027* (2013.01);
(Continued)

(58) Field of Classification Search
CPC ..... E05F 1/16; E05F 1/08; E05F 5/003; E05F 5/027; E05F 5/02; E05F 5/00;
(Continued)

(56) References Cited

U.S. PATENT DOCUMENTS 3,502,280 A * 3/1970 Matthews ................. E05F 1/16 188/82.6
4,427,163 A * 1/1984 Kondziola .............. B60R 22/34 242/375.3
(Continued)

FOREIGN PATENT DOCUMENTS

DK 163889 A 10/1989
EP 2017422 A1 1/2009
(Continued)

OTHER PUBLICATIONS

International Search Report and Written Opinion of the ISA issued in PCT/AU2023/050792, mailed Nov. 30, 2023; ISA/AU.
(Continued)

*Primary Examiner* — Chuck Y Mah
(74) *Attorney, Agent, or Firm* — Harness, Dickey & Pierce, P.L.C.

(57) ABSTRACT

The present invention provides a closing mechanism for closing a door/window. The door/window slides relative to a door/window frame which incorporates a door/window jamb. The closing mechanism comprises a biasing assembly extending between the door and the door jamb, wherein the biasing assembly provides a biasing force to bias the door towards a closed position. The closing mechanism comprises a speed control assembly operatively connected to the biasing assembly, to selectively control the speed at which the door closes. The closing mechanism also comprises a restraining assembly operatively connected to the speed
(Continued)

control assembly to control the acceleration of the door as the door approaches the closed position.

22 Claims, 14 Drawing Sheets

(51) Int. Cl.
*E05F 5/00* (2017.01)
*E05F 5/02* (2006.01)

(52) U.S. Cl.
CPC ..... *E05Y 2201/21* (2013.01); *E05Y 2201/214* (2013.01); *E05Y 2201/266* (2013.01); *E05Y 2201/412* (2013.01); *E05Y 2201/46* (2013.01); *E05Y 2201/482* (2013.01); *E05Y 2201/626* (2013.01); *E05Y 2201/652* (2013.01); *E05Y 2201/654* (2013.01); *E05Y 2900/132* (2013.01); *E05Y 2900/148* (2013.01)

(58) Field of Classification Search
CPC ............. E05Y 2201/20; E05Y 2201/21; E05Y 2201/214; E05Y 2201/216; E05Y 2201/266; E05Y 2201/41; E05Y 2201/412; E05Y 2201/46; E05Y 2201/462; E05Y 2201/482; E05Y 2201/50; E05Y 2201/626; E05Y 2201/652; E05Y 2201/654; E05Y 2900/132; E05Y 2900/148
See application file for complete search history.

(56) References Cited

U.S. PATENT DOCUMENTS

| | | | | |
|---|---|---|---|---|
| 5,031,798 | A | 7/1991 | Wild | |
| 5,630,249 | A * | 5/1997 | Rebai, Jr. | E05F 3/16 16/77 |
| 5,937,478 | A * | 8/1999 | Regnier | E05F 1/16 16/77 |
| 6,021,607 | A * | 2/2000 | Angove | E05F 1/16 49/404 |
| 6,735,820 | B1 * | 5/2004 | Teutsch | E05F 1/00 16/72 |
| 2005/0000057 | A1 | 1/2005 | Tsekhanovsky et al. | |
| 2013/0019432 | A1 | 1/2013 | Smith | |

FOREIGN PATENT DOCUMENTS

| | | | | |
|---|---|---|---|---|
| FR | 2904852 | A1 * | 2/2008 | E05F 1/16 |
| GB | 2479906 | A * | 11/2011 | E05F 1/008 |
| JP | 11315662 | A * | 11/1999 | |
| JP | 11324475 | A * | 11/1999 | |
| JP | 2000130004 | A * | 5/2000 | |
| JP | 2000291326 | A * | 10/2000 | |
| WO | WO-8703033 | A1 * | 5/1987 | E05F 5/003 |
| WO | 2015051398 | A1 | 4/2015 | |
| WO | WO-2023100171 | A1 * | 6/2023 | E05D 13/1292 |

OTHER PUBLICATIONS

International Preliminary Report on Patentability issued in PCT/AU2023/050792, mailed Dec. 4, 2024; IPEA/AU.

* cited by examiner

CLOSING MECHANISM

CROSS REFERENCE TO RELATED APPLICATIONS

This application is a U.S. National Phase Application under 35 U.S.C. 371 of International Application No. PCT/AU2023/050792 filed on Aug. 21, 2023, which claims priority to Australian Patent Application No. 2022902373 filed on Aug. 19, 2022. The entire disclosures of the above applications are incorporated herein by reference.

TECHNICAL FIELD

The present invention relates to a mechanism for closing doors or windows.

The invention has been devised particularly, although not necessarily solely, in relation to a mechanism for closing sliding doors or sliding windows, and in particular mechanisms for automatically closing doors or windows.

BACKGROUND

The following discussion of the background art is intended to facilitate an understanding of the present invention only. The discussion is not an acknowledgement or admission that any of the material referred to is or was part of the common general knowledge as at the priority date of the application.

It is known to provide closing mechanisms for building closures, such as doors or windows, to automatically cause the closure to close after having been opened. Some examples of these closing mechanisms include the use of hydraulic means, counterweights and reel springs for moving the closure.

However, the majority of these closing mechanisms suffer from one or more deficiencies. One such problem is that the door builds up a relatively large kinetic energy from the force applied by the closing mechanism, resulting in the speed of the closing door progressively increasing as it closes, before slamming closed against the door's side jamb. For doors that are only partially opened before automatically closing, the resultant closing speed and the slamming closed are within tolerable limits. However, a door that is automatically closed from a fully or near fully opened position does so with sufficient force that it can injure a person within the closure, e.g. if a child were to have their fingers caught between the door and the side jamb.

Furthermore, the closing of the door causes a loud noise, often being of great annoyance to people, and can also result in damage to the door, the door lock, side jamb or a window pane located within the door.

Furthermore, depending on personal preference, or particular circumstances and/or particular use of the door, it may be desired that the speed of closure of the door may be varied. For example, it may be desired that an emergency door, such as a fire door, is closed as soon as possible after operation of the fire alarm system. Alternatively, at home or care centers, the preference may be that a sliding door closes in a gentle manner to avoid injury of the occupants of the home or care centers.

Furthermore, in conventional systems having sliding doors that close automatically, the speed control system (that which reduces the speed of the closing door) is also operational when the door needs to be open. The fact that the speed control system is also operational during opening of the door is particularly disadvantageous because the inherent resistance provided by the speed control system when the door closes must be overcome when the door is being opened. This is cumbersome and may impede the elderly and children from opening the door easily.

Below are examples of conventional systems which provide closing mechanisms for automatically sliding doors.

For example, European patent application 08160499.3 discloses a speed control device using an eddy current brake. However, this particular speed control device does not allow control of the speed of the sliding door as it automatically closing.

Further, Japanese patent document JP2000130004 discloses a speed control device which uses a fluid that offers resistance in order to reduce the speed of the door as it closes.

Furthermore, Danish patent document DK163889 is related to a system for closing a fire door includes a speed regulator. The system is characterized in that the drive means is in the form of at least two belts or chain drives, which together form a rotational speed-increasing exchange, each of the chain drives having a sprocket mounted on a common shaft and driven by a drive means directly coupled to the carrier wheel and the brake being an eddy current brake having a plurality of alternating polarity magnets cooperating with the brake rotor in the form of a brake disc such that the speed of the door or the gate decreases as it exceeds a certain, preferably adjustable value.

It is against this background that the present invention has been developed.

SUMMARY

It is an object that this invention ameliorates, mitigates or overcomes, at least one disadvantage of the prior art, or which will at least provide the public with a practical choice.

The present invention is in the form of a closing mechanism which facilitates the closing of an opening, such as a door opening or window opening by closing the opening, such as with a door or a window. The closing mechanism seeks to return the door/window towards/to a closed position. Once the opening force is removed from the door/window, or a brake is disengaged, the closing mechanism causes the door/window to move towards its closed position. The closing mechanism controls the acceleration of the door/window as it moves towards its closed position. This enables the door/window to close gently.

According to a first aspect of the invention there is provided a closing mechanism for closing a door, the door sliding relative to a door frame, the door frame having a door jamb, the closing mechanism comprising:

- a biasing assembly extending between the door and the door jamb, wherein the biasing assembly provides a biasing force to bias the door towards a closed position;
- a speed control assembly operatively connected to the biasing assembly, to selectively control the speed and acceleration at which the door closes.

According to a second aspect of the invention there is provided a closing mechanism for closing a door, the door sliding relative to a door frame, the door frame having a door jamb, the closing mechanism comprising:

- a biasing assembly extending between the door and the door jamb, wherein the biasing assembly provides a biasing force to bias the door towards a closed position;
- a speed control assembly operatively connected to the biasing assembly, to selectively control the speed at which the door closes;

- a restraining assembly operatively connected to the speed control assembly to control the acceleration of the door as the door approaches the closed position.

The closing mechanism may also comprise a brake to hold the door in an open or partially open position.

The closing mechanism may also comprise a disengagement means to disengage the action of the closing mechanism on the door.

According to a third aspect of the invention there is provided a closing mechanism for closing a door which slides relative to a door frame, the door frame having a door jamb, the closing mechanism comprising:

- a biasing assembly having a cable spool for winding or unwinding a cable thereon during rotation of the cable spool, the cable is adapted to extend between the door and the door jamb when the door is in an open condition, and
- a speed control assembly having a restraining assembly, the cable spool and the speed control assembly being connected with respect to each other to affect the rotational speed of the cable spool, wherein the restraining assembly is adapted to affect the rotational movement of the cable spool.

Preferably, the restraining assembly is a magnetic restraining assembly.

Preferably, the cable spool is in the form of a cable retractor.

According to a fourth aspect of the invention there is provided a closing mechanism for closing a door which slides relative to a door frame, the door frame having a door jamb, the closing mechanism comprising:

- a biasing assembly having a cable spool for winding or unwinding a cable thereon during rotation of the cable spool, the cable is adapted to extend between the door and the door jamb when the door is in an open condition,
- a speed control assembly having a restraining assembly, the cable spool and the speed control assembly being connected with respect to each other to affect the rotational speed of the cable spool, wherein the restraining assembly is adapted to affect the rotational movement of the cable spool, and
- a braking assembly to brake the biasing assembly, wherein the braking assembly comprises a lever being movable between a disengaged position, and an engaged position, wherein a distal end of the lever is adapted to engage with the speed control assembly for stopping movement of the cable spool.

Preferably, the restraining assembly is a magnetic restraining assembly.

Preferably, the distal end comprises at least one magnet for engagement with a metallic portion of the magnetic restraining assembly, such as an inner washer or a metal plate incorporated therein.

Preferably, the braking assembly is adapted to disengage from the cable spool as rotational movement of the cable spool commences.

Preferably, upon rotation of the cable spool at least one node of the cable spool push a pawl of the lever away from the node to locate the braking assembly in a released condition.

Preferably, there are six nodes.

Preferably, the lever comprises a trigger extending from a proximal end of the lever and extending out of the exterior of the housing which enables use of the braking system by a user.

Preferably, the lever is adapted to allow manual control of the braking system by a user.

According to a fifth aspect of the invention there is provided a closing mechanism for automatically closing a door which slides within a door frame, the door frame having a side jamb, the closing mechanism comprising: a biasing assembly having a cable adapted to extend between the door and the side jamb when the door is in an open condition, the cable is caused to be received in and out of the biasing assembly according to movement of the door; and a speed control assembly restraining assembly; wherein the biasing assembly and the speed control assembly are operatively connected with respect to each other for controlling the speed and acceleration of the cable entering the biasing assembly as the door moves towards its closed position.

According to a sixth aspect of the invention there is provided a closing mechanism for automatically closing a door which slides within a door frame, the door frame having a side jamb, the closing mechanism comprising: a biasing assembly having a cable retractor for selectively winding or unwinding a cable thereon during rotation of the cable retractor, the cable being adapted to be extended between the door and the side jamb when the door is in an open condition; and a speed control assembly having a magnetic restraining assembly, the cable retractor and the speed control assembly being operatively connected with respect to each other for restraining rotational speed of the cable retractor, wherein the magnetic restraining assembly is adapted to control the amount of restraint to be provided to rotational movement of the cable retractor.

Preferably, the magnetic restraining assembly comprises a magnetic plate and a resistor plate arranged in a spaced apart relationship with respect to each other for generating eddy currents during movement of the magnetic plate and resistor plate with respect to each other, wherein the magnetic restraining assembly is adapted to vary the spacing between the magnetic plate and the resistor plate for controlling the amount of resistance to be applied by the magnetic restraining assembly to the cable retractor.

Preferably, the magnetic restraining assembly comprises a resistor plate and a magnet plate arranged in a spaced apart relationship with respect to each other, wherein the resistor plate is adapted to move with respect to the magnet plate causing the distance between the magnet plate and the resistor plate to be varied. This may be achieved in a number of ways as would be known by a person skilled in the art. For instance, the resistor plate may pivot angularly with respect to the magnet plate, or vice versa. The resistor plate may also be pulled away from the magnet plate but maintain a substantially parallel orientation to each other.

Preferably, the magnetic restraining assembly further comprises a first washer and second washers sandwiching the resistor plate and the magnet plate.

Preferably, the first washer is located below the resistor plate.

Preferably, the second washers comprise concentric outer and inner washers.

Preferably, the outer washer covers the magnets.

Preferably, the closing mechanism comprises a housing adapted to receive the cable retractor and the speed control system to permit rotational movement of the cable retractor and rotational movement of the magnet plate.

Preferably, the resistor plate is adapted to be pivotally attached to a section of the housing permitting pivotal movement of the resistor plate with respect to the magnet plate.

Preferably, the magnetic restraining assembly comprises outer washers sandwiching the magnet plate and the resistor plate therebetween.

Preferably, the resistor plate is adapted to be pivoted by a user of the closing mechanism to pivot the resistor plate at a particular angle with respect to the magnet plate.

Preferably, the closing mechanism further comprises means for the user to engage with the resistor plate for varying distance between the resistor plate and the magnet plate.

Preferably, the resistor plate comprises an arm extension extending tangentially away from the outer periphery of the resistor plate for engagement with the means for the user to engage with the resistor plate.

Preferably, the means for the user to engage with the resistor plate comprises an adjuster screw having a distal end configured as an inclined ramp for engagement with the arm extension.

Preferably, the adjuster screw is adapted to be slidably attached to the housing of the closing mechanism.

Preferably, the adjuster screw comprises a knob extending outside of the housing to allow handling of the adjuster screw by the user.

Preferably, the magnet plate comprises indentations arranged in a spaced apart relationship with respect to each other, each indentation being adapted to receive a magnet.

Preferably, there are a plurality of magnets.

Preferably, the quantity of magnets is a multiple of two (2).

Preferably, each magnet having a north and a south pole is assembled into the magnet plate.

Preferably, the north and south poles of the magnets are exposed at both sides of the magnet plate.

Preferably, adjacent magnets have alternating poles.

Preferably, each magnet is located between two neighbouring magnets, wherein the neighbouring magnets have their north poles facing opposite to the north pole of each magnet located between the neighbouring magnets.

In a particular arrangement, the magnets are assembled into the magnet plate in a spaced apart relationship with respect to each other in such a manner to increase the magnetic field.

Preferably, the resistor plate is configured as a washer comprising a ring-shaped body.

Preferably, the resistor plate comprises a formation configured with extensions defining pins adapted to be received within a compartment defined in the housing to allow pivotal movement of the resistor plate.

Preferably, the closing mechanism further comprises a braking assembly to brake the biasing assembly.

Preferably, the braking assembly comprises a lever being movable between (1) a disengaged position, and (2) an engaged position, wherein a distal end of the lever is adapted to be engaged with the magnetic plate for stopping movement of the cable retractor.

Preferably, the distal end comprises a magnet for engagement with either a metallic portion of the magnetic restraining assembly, such as an inner washer, an outer washer, a metal plate or similar.

Preferably, the braking assembly is adapted to be disengaged from the cable retractor during starting of the rotational movement of the cable retractor.

Preferably, there are nodes within the cable retractor that upon rotation of the cable retractor push the pawl of the lever away from the node locating the braking assembly in the released condition.

Preferably, there are six nodes.

Preferably, the lever comprises a trigger extending from a proximal end of the lever and extending out of the exterior of the housing to allow control of the braking system by a user.

According to a seventh aspect of the invention there is provided a closing mechanism for automatically closing a door sliding within a door frame having a side jamb, the closing mechanism comprising:

a biasing assembly having a cable retractor for selectively winding or unwinding a cable thereon or therefrom during rotation of the cable retractor, the cable being adapted to be extended between the door and the side jamb when the door is in open condition, and a belt drive operatively connected to the cable retractor;

wherein the cable retractor and the belt drive are operatively connected with respect to each other in such a manner that the cable retractor and the belt drive are disengaged with respect to each other during opening of the door and engaged with respect to each other during closing of the door.

Preferably, the closing mechanism further comprises a speed control assembly having a magnetic restraining assembly, the belt drive and the speed control assembly being operatively connected with respect to each other for restraining rotational speed of the cable retractor when the cable retractor and the belt drive are engaged with respect to each other during closing of the door.

In one aspect of the invention, the biasing assembly further comprises a sprag clutch for connecting the belt drive and the cable retractor with respect to each other, the sprag clutch being adapted to be selectively displaced between (1) a retracted condition in order for the cable retractor to be disengaged from the belt drive and (2) an engaged condition, for the cable retractor to be engaged with the belt drive.

In another aspect of the invention, the biasing assembly further comprises a one way bearing for connecting the belt drive and the cable retractor with respect to each other, the one way bearing being adapted to be selectively move between (1) an unlocked rotation condition wherein the bearing is free to rotate wherein the cable retractor is disengaged from the belt drive, and (2) an locked condition wherein the cable retractor is engaged with the belt drive.

In other aspects of the invention, and as would be understood by the person skilled in the art, other devices which allow movement in one direction but prevent movement in the opposite direction can equally be applied in place of the sprag clutch or one way bearing. These aspects are considered to fall within the scope of the present invention.

Preferably, the sprag clutch comprises a plurality of tubular wedges which when in the retracted condition results in disengagement of the belt drive with respect to the cable retractor and when in the engaged condition the belt drive and cable retractor are engaged to each other.

Preferably, the sprag clutch comprises a hooked plate (also referred to as a pawl) defining recesses for receiving the tubular wedges, the hooked plate being configured so that, during opening of the door, the tubular wedges are kept within the recesses resulting in that the cable retractor is disengaged from the belt drive and during closing of the door the sprag clutch rotates resulting in that the tubular wedges are released from the recesses in a centrifugal manner, wedging against the belt drive, resulting in that the cable retractor is engaged to the belt drive.

Preferably, the hooked plate comprises an inner surface having ridges adapted to allow for engagement with the tubular wedges and allowing for easy release from the ridges of the wedges when the door is opened.

According to a eighth aspect of the invention there is provided a closing mechanism for closing a door, the door sliding relative to a door frame, the door frame having a door jamb, the closing mechanism comprising:

a biasing assembly having a cable adapted to extend between the door and the side jamb when the door is in an open condition, wherein the biasing assembly provides a biasing force to cause the cable to be received in a housing whereupon the door moves towards a closed position;

a speed control assembly operatively connected to the biasing assembly, to selectively control the speed and acceleration at which the door closes; and a safety cable system operatively attached to the cable for maintaining the section of the cable extending between the door and the side jamb in a taut condition.

According to a ninth aspect of the invention there is provided a closing mechanism for automatically closing a door sliding within a door frame, the door frame having a side jamb, the closing mechanism comprising:

a biasing assembly having a cable retractor for selectively winding or unwinding a cable thereon during rotation of the cable retractor, the cable having a first section which extends between the door and the side jamb when the door is in an open condition, and a safety cable system operatively attached to the cable for maintaining the section of the cable extending between the door and the side jamb extended and tensioned.

Preferably, the safety cable system comprises a tensioning means to maintain the cable in a state of tension.

The tensioning means may comprise a ballast attached to the cable.

In a first arrangement, the ballast comprises a weight attached to a proximal end of the cable.

In a second arrangement, the ballast comprises a weight attached to a section of the cable being located within the closing mechanism.

According to a tenth aspect of the invention there is provided a closing mechanism for closing a door, the closing mechanism comprising:

a housing which is adapted to be secured to the door, the housing houses a biasing assembly and a speed control assembly;

the biasing assembly has a cable spool for winding or unwinding a cable thereon, the cable is adapted to extend between the housing and the structure when the door is in an open condition, and the speed control assembly having a magnetic restraining assembly, the cable spool and the speed control assembly operatively interact to affect the rotational speed of the cable spool, wherein the magnetic restraining assembly is adapted to affect the rotational movement of the cable spool to control the speed at which the door closes.

According to a further aspect of the invention there is provided a closing mechanism for closing a door which slides relative to a door frame, the door frame having a door jamb, the closing mechanism comprising:

a biasing assembly having a cable spool for winding or unwinding a cable thereon during rotation of the cable spool, the cable is adapted to extend between the door and the door jamb when the door is in an open condition, a speed control assembly having a restraining assembly, the cable spool and the speed control assembly being directly connected with respect to each other to control the rotational speed of the cable spool, wherein the restraining assembly is adapted to affect the rotational movement of the cable spool, and a braking assembly to brake the biasing assembly, wherein the braking assembly comprises a lever being movable between a disengaged position, and an engaged position, wherein a distal end of the lever is adapted to engage with the speed control assembly for stopping movement of the cable spool.

According to a further aspect of the invention there is provided a closing mechanism for closing a door, the closing mechanism comprising:

a housing which is adapted to be secured to the door, the housing houses a biasing assembly and a speed control assembly;

the biasing assembly has a cable spool for winding or unwinding a cable thereon, the cable is adapted to extend between the housing and the structure when the door is in an open condition, and the speed control assembly having a magnetic restraining assembly, the cable spool and the speed control assembly operatively interact to control the rotational speed of the cable spool, wherein the magnetic restraining assembly is adapted to affect the rotational movement of the cable spool to control the speed at which the door closes.

According to a further aspect of the invention there is provided a closing mechanism for closing a door which slides relative to a door jamb, the closing mechanism comprising:

a biasing assembly having a cable spool for winding or unwinding a cable thereon during rotation of the cable spool, the cable is adapted to extend between the door and the door jamb when the door is in an open condition, and a speed control assembly having a restraining assembly, the cable spool and the speed control assembly being operatively connected with respect to each other to control the rotational speed of the cable spool, wherein the restraining assembly is adapted to affect the rotational movement of the cable spool.

According to a further aspect of the invention there is provided a closing mechanism for closing a door, the door sliding relative to a door frame, the door frame having a door jamb, the closing mechanism comprising:

a biasing assembly extending between the door and the door jamb, wherein the biasing assembly provides a biasing force to bias the door towards a closed position;

a speed control assembly directly connected to the biasing assembly, to selectively control the speed and acceleration at which the door closes.

According to a further aspect of the invention there is provided a closing mechanism for closing a door, the door sliding relative to a door frame, the door frame having a door jamb, the closing mechanism comprising:

a biasing assembly extending between the door and the door jamb, wherein the biasing assembly provides a biasing force to bias the door towards a closed position;

a speed control assembly directly connected to the biasing assembly, to variably control the speed at which the door closes;

a restraining assembly operatively connected to the speed control assembly to control the acceleration of the door as the door approaches the closed position.

According to a further aspect of the invention there is provided a closing mechanism for automatically closing a door which slides within a door frame, the door frame having a side jamb, the closing mechanism comprising: a biasing assembly having a cable adapted to extend between the door and the side jamb when the door is in an open condition, the cable is caused to be received in and out of the biasing assembly according to movement of the door; and a speed control assembly restraining assembly; wherein the biasing assembly and the speed control assembly are operatively connected to interact with each other for controlling the speed and acceleration of the cable entering the biasing assembly as the door moves towards its closed position.

According to a further aspect of the invention there is provided a closing mechanism for closing a door, the door sliding relative to a door frame, the door frame having a door jamb, the closing mechanism comprising:

a biasing assembly having a cable adapted to extend between the door and the side jamb when the door is in an open condition, wherein the biasing assembly provides a biasing force to cause the cable to be received in a housing whereupon the door moves towards a closed position;

a speed control assembly directly connected to the biasing assembly, to selectively control the speed and acceleration at which the door closes; and a safety cable system operatively attached to the cable for maintaining the section of the cable extending between the door and the side jamb in a taut condition.

According to a further aspect of the invention there is provided a sliding door comprising a closing mechanism as herein described.

According to a further aspect of the invention there is provided a sliding window comprising a closing mechanism as herein described.

BRIEF DESCRIPTION OF THE DRAWINGS

Further features of the present invention are more fully described in the following description of several non-limiting embodiments thereof. This description is included solely for the purposes of exemplifying the present invention. It should not be understood as a restriction on the broad summary, disclosure or description of the invention as set out above. The description will be made with reference to the accompanying drawings in which.

Figure 1:
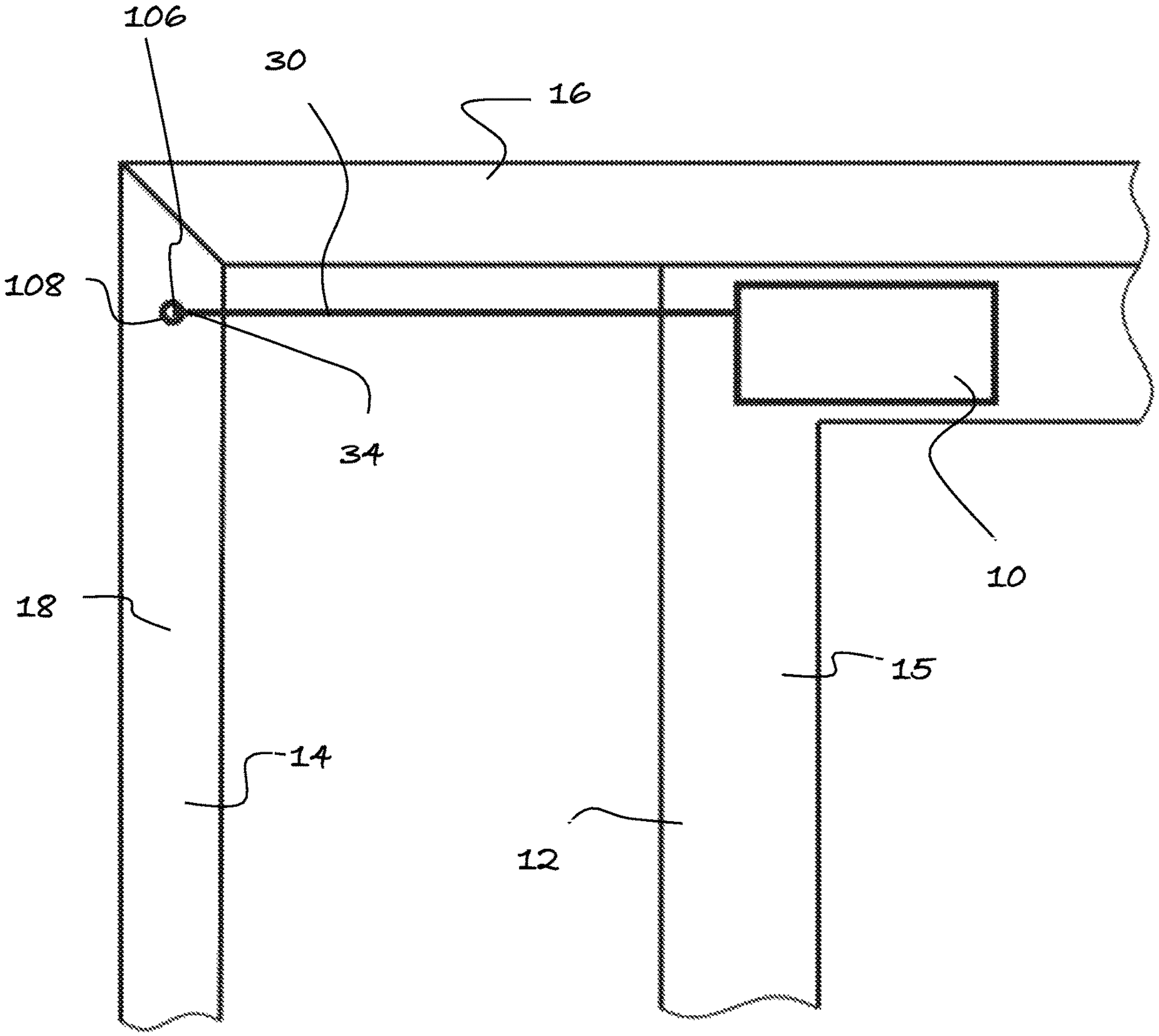
FIG. 1 is a side view of a sliding door in an open condition and to which a closing mechanism in accordance with an embodiment of the present invention is attached for closing the sliding door.
Figure 2:
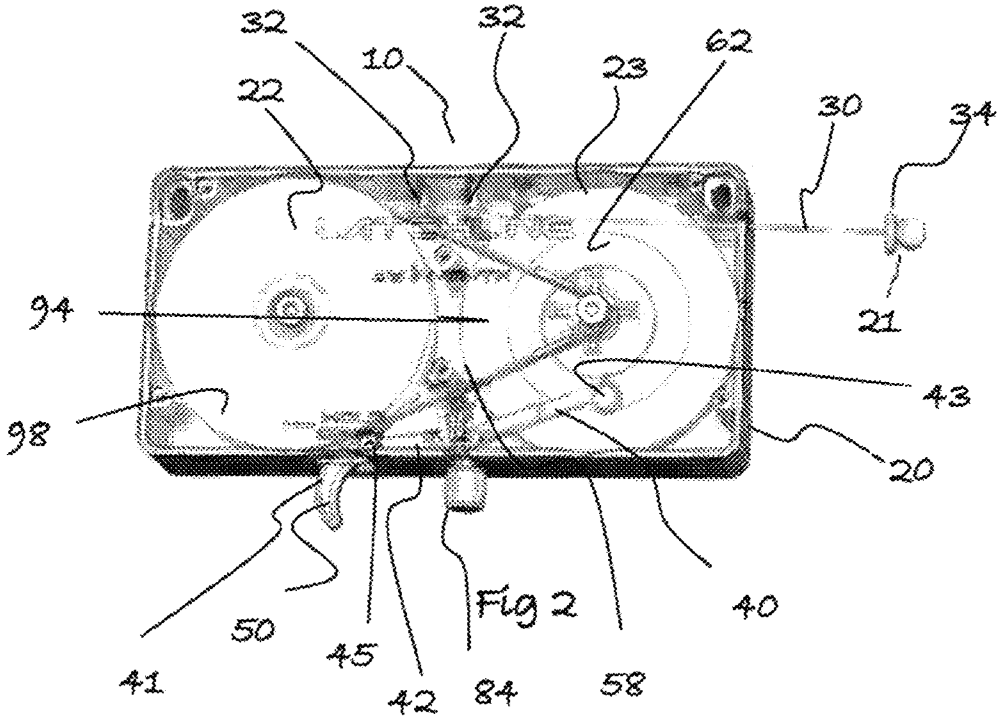
FIG. 2 is a top perspective view of a first arrangement of the closing mechanism in accordance with the embodiment of the present invention, shown with a transparent cover for illustration purposes.
Figure 7:
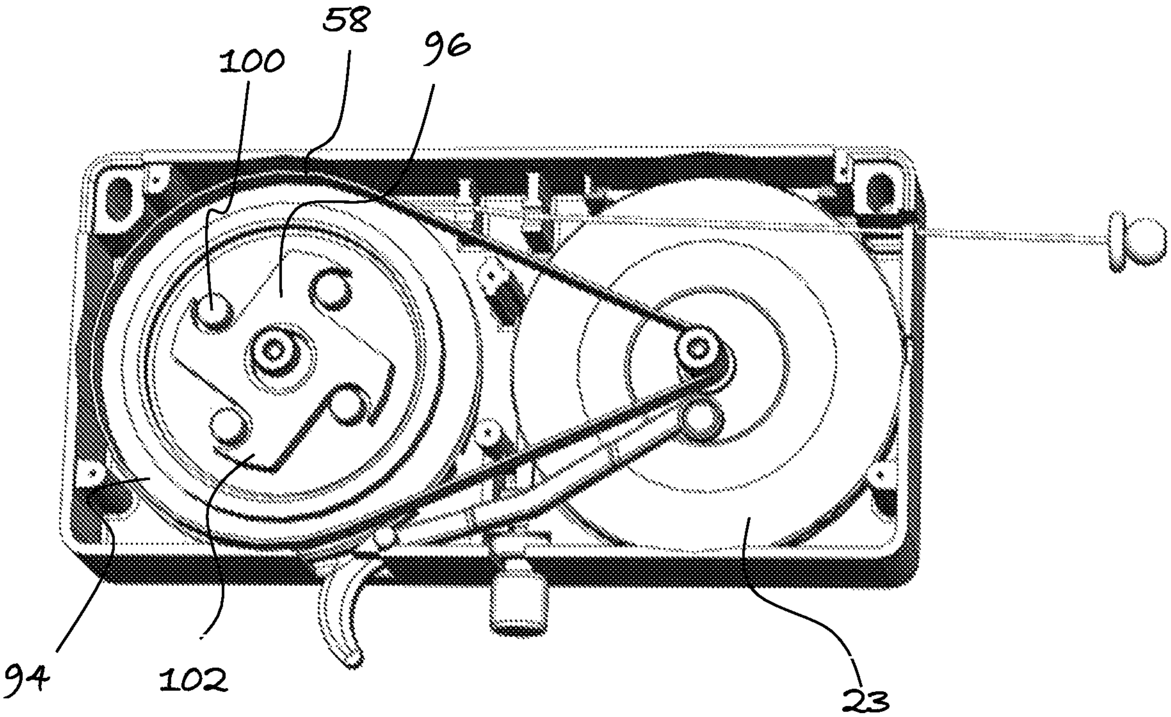
FIGS. 7 and 8 are top perspective views of the closing mechanism shown in FIG. 2, respectively, showing the sprag clutch in the retracted (FIG. 7), and engaged (FIG. 8) condition with the cover and various components removed to show the interior of the biasing assembly for illustration purposes.
Figure 17:
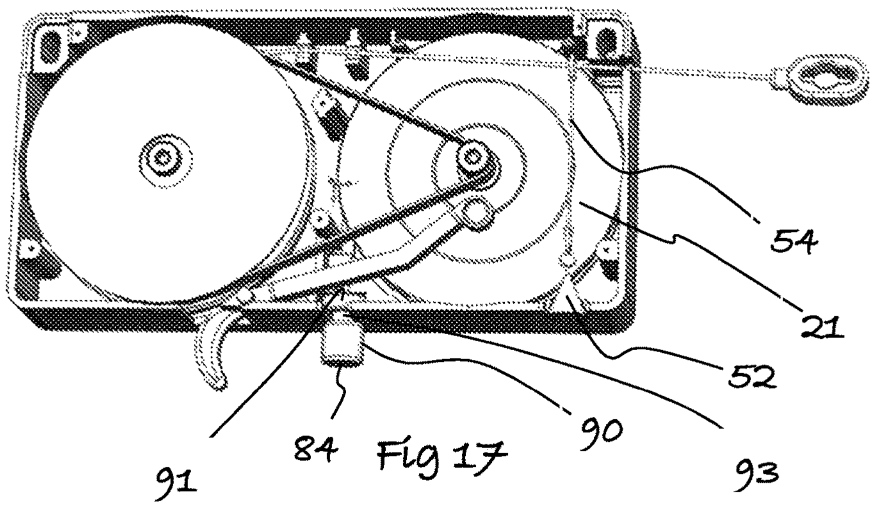
Figure 18:
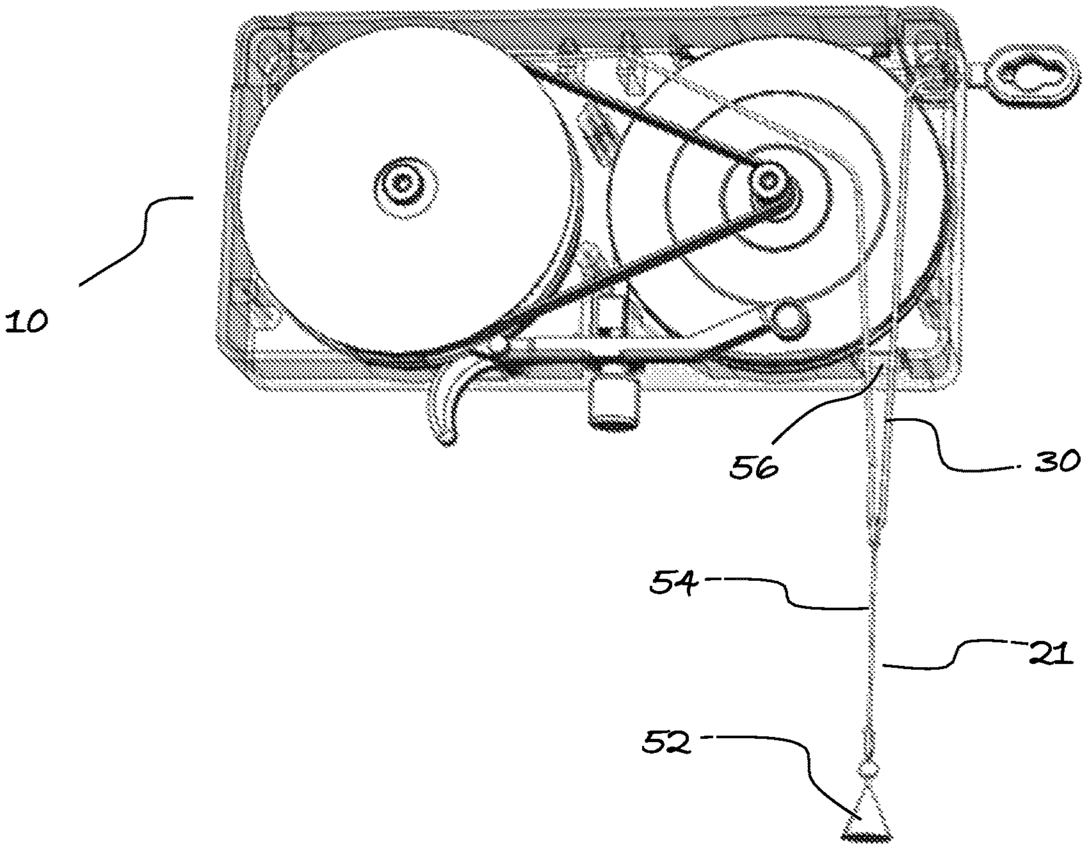
Figure 19:
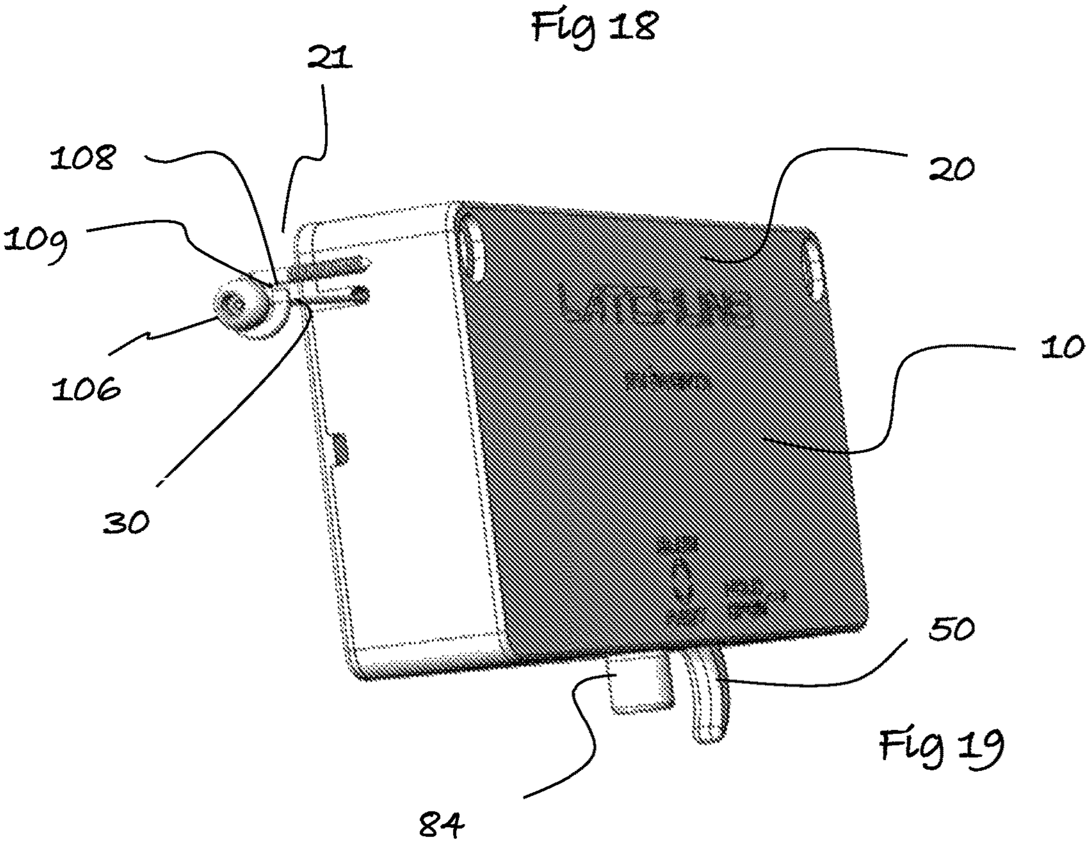
Figure 20:
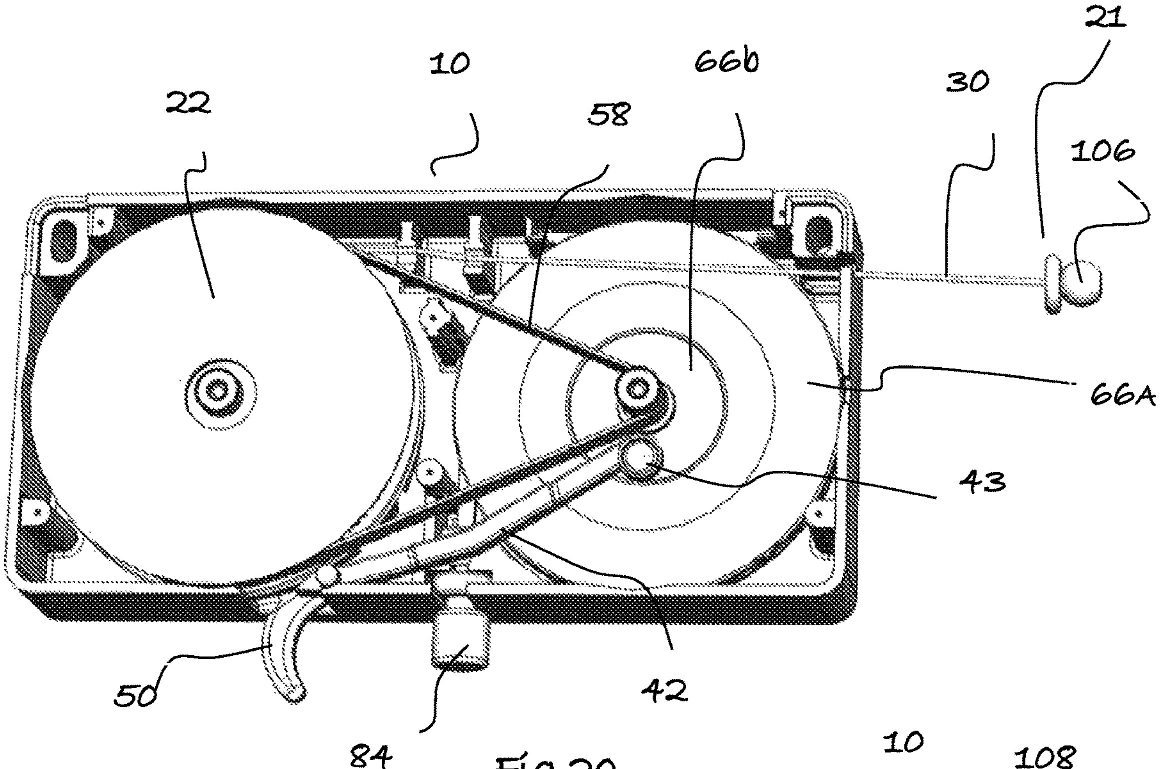
Figure 21:
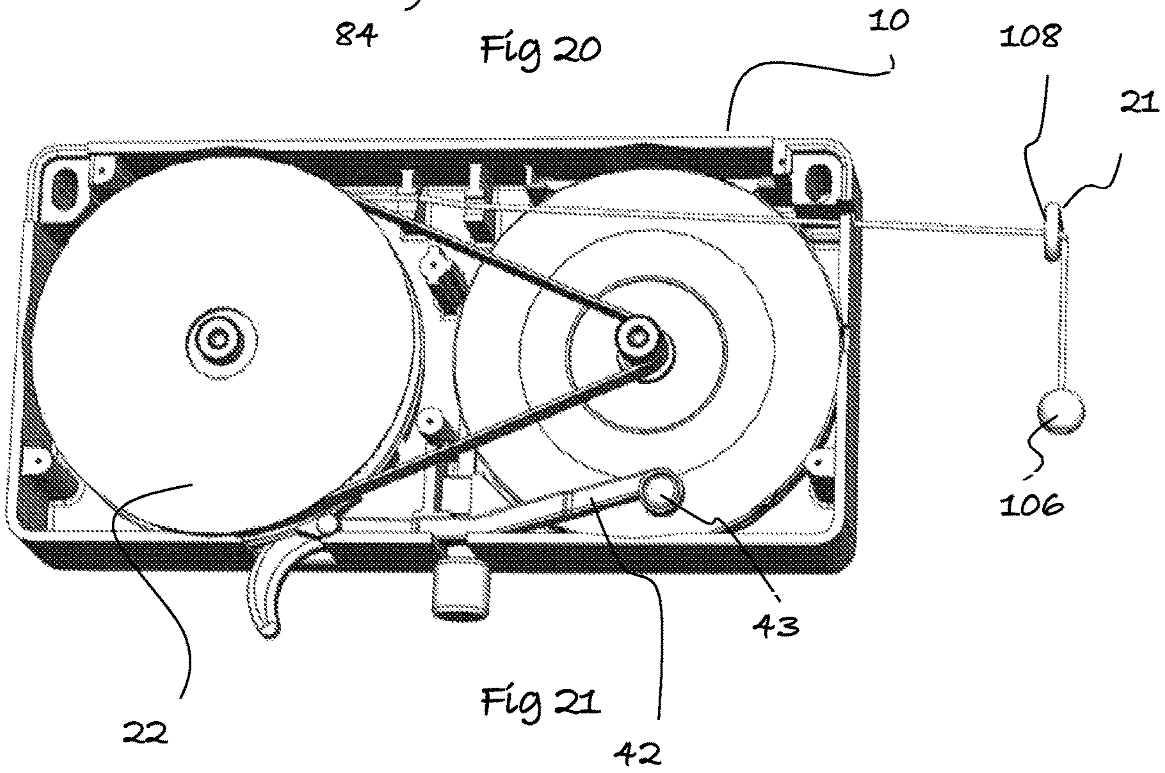
Figure 22:
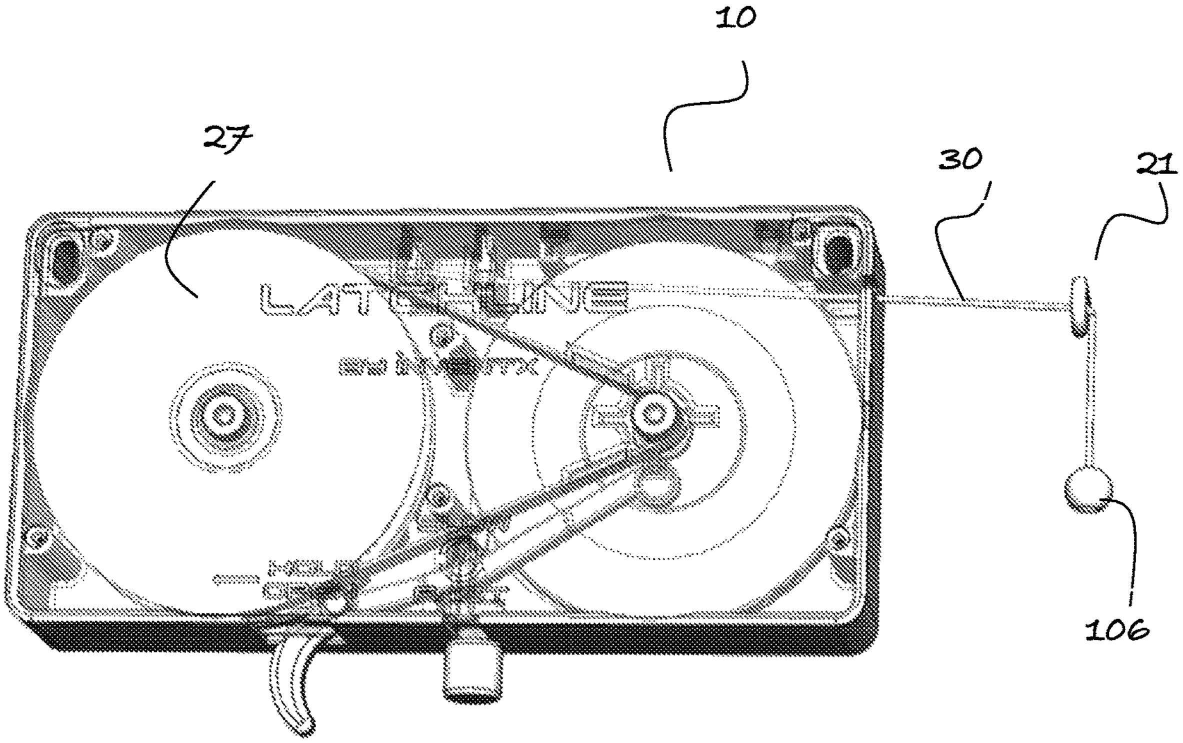
Figure 23:
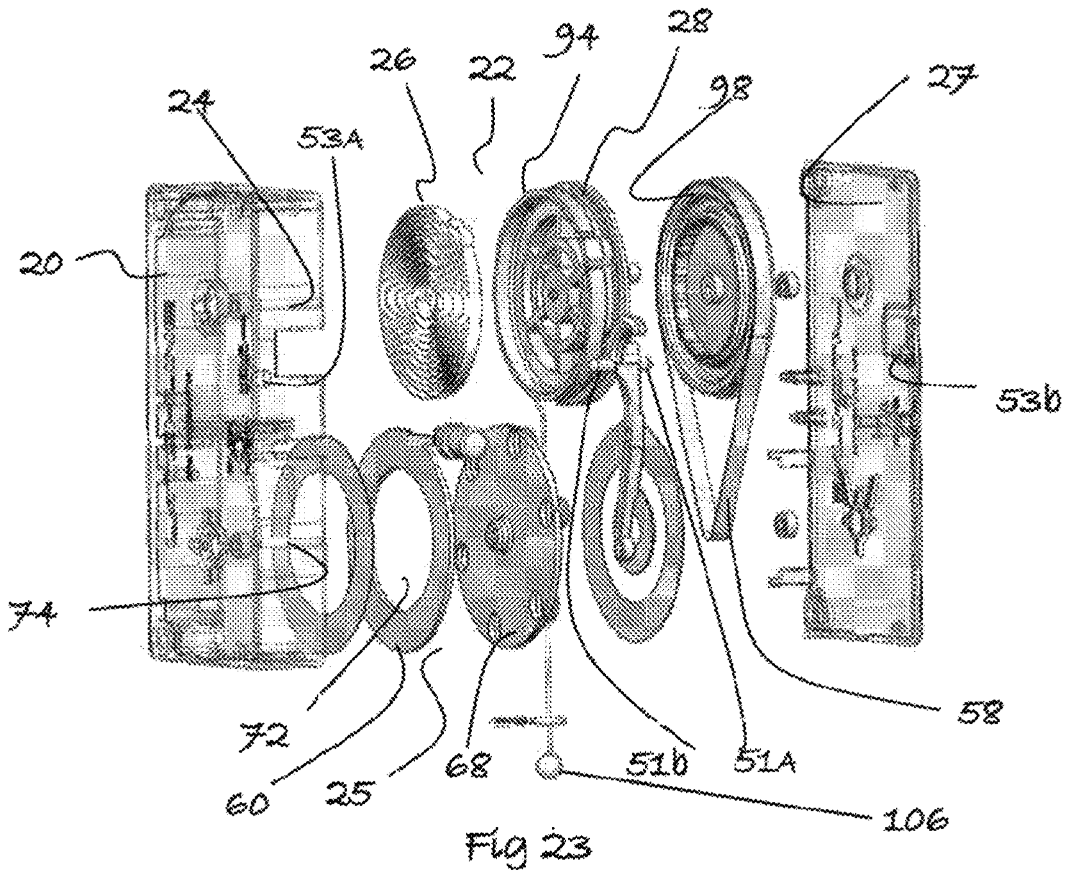
Figure 24:
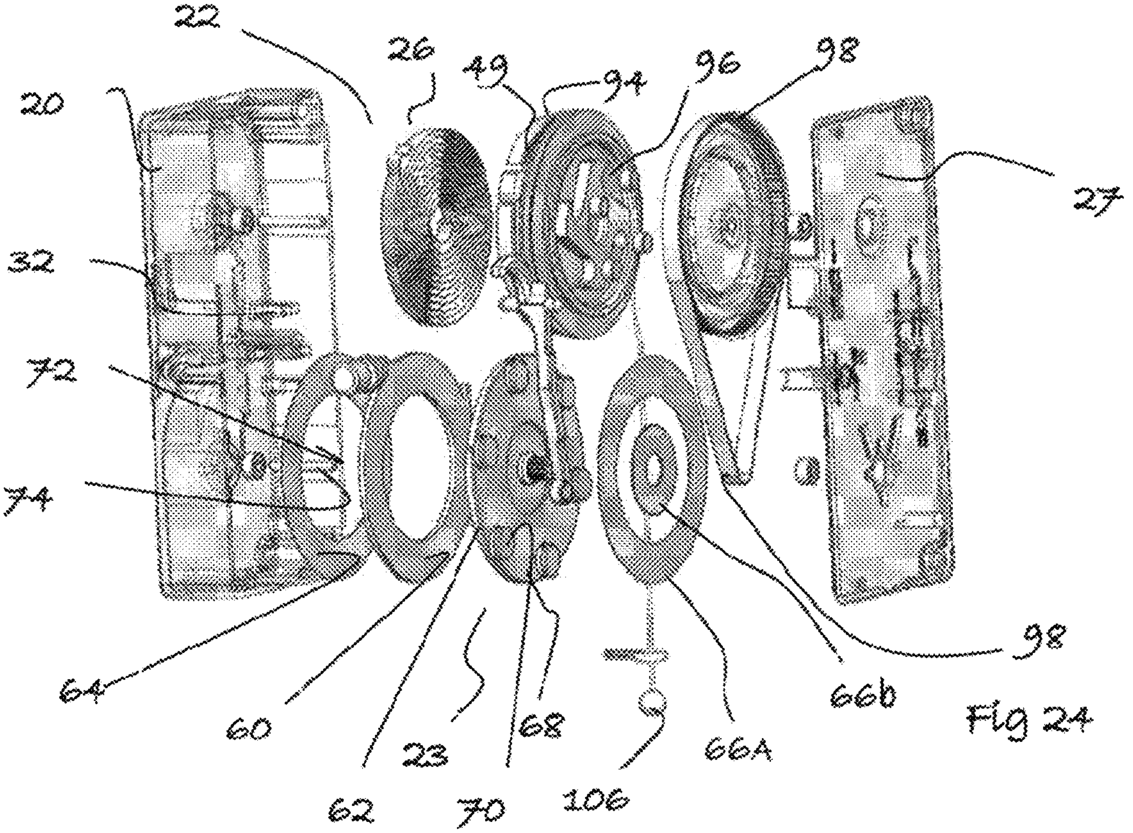
Figure 25:
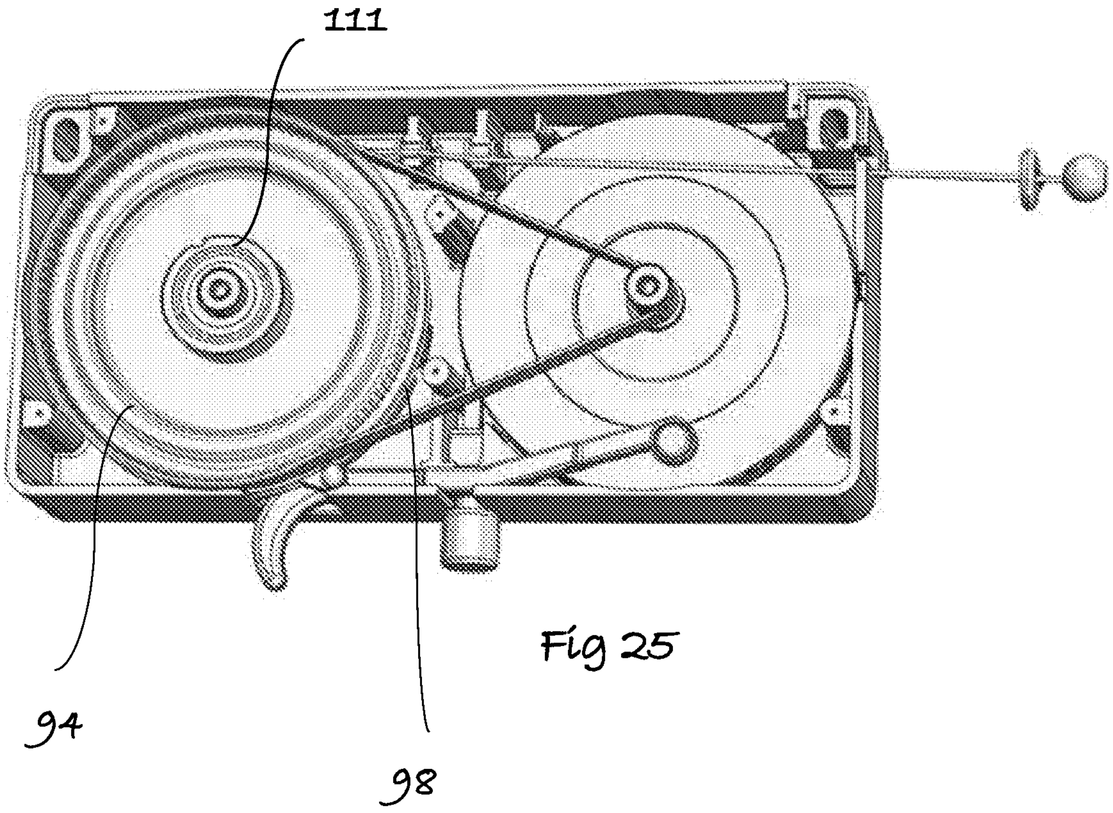

FIG. **16*b*** is a perspective view of a screw adjuster in a disassembled condition;

FIG. 17 is a top perspective view of a closing mechanism incorporating a second arrangement of a safety cable system;

FIG. 18 is a top perspective view of the closing mechanism shown in FIG. 17, wherein the safety cable system has been activated;

FIG. 19 is a perspective view of the closing mechanism of FIG. 2 ready for installation to a door assembly as shown in FIG. 1;

FIG. 20 is a top perspective view of the closing mechanism shown in FIG. 19 in a released condition with the cover removed for illustration purposes;

FIG. 21 is a top perspective view of the closing mechanism shown in FIG. 19 in a braked condition with the cover removed for illustration purposes with the cable safety system in use;

FIG. 22 is a top perspective view of the closing mechanism shown in FIG. 19 in the released condition with a transparent cover for illustration purposes with the cable safety system in use;

FIG. 23 is an exploded left hand perspective view of the closing mechanism shown in FIG. 19;

FIG. 24 is an exploded right hand perspective view of the closing mechanism shown in FIG. 19; and FIG. 25 is a top perspective view of the closing mechanism shown in FIG. 2, showing a one way bearing as an alternative to the sprag clutch shown in FIG. 7, the cover and various components being removed to show the interior of the closing mechanism for illustration purposes.

DETAILED DESCRIPTION

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

Even though particular combinations of features are recited herein, these combinations are not intended to limit the disclosure of possible implementations. In fact, many of these features may be combined in ways not specifically recited disclosed in the specification.

The closing mechanism 10 in accordance with an embodiment of the present invention is particularly useful for automatically closing a sliding door 12, or a sliding window. In particular, in accordance with a particular arrangement of the embodiment of the present invention, the closing mechanism 10 is adapted to control the speed at which the door 12 closes, permitting users to advantageously adjust the speed at which the door 12 or window closes, depending on their preference. As discussed below, controlling the speed of the movement of the door 12 is accomplished via a biasing assembly 22 which is operatively connected via belt 58 to a speed control assembly 23 (see FIG. 2). The biasing assembly 22 comprises a cable retractor 94 and a belt drive 98 for rotating the belt 58 during rotation of the cable retractor 94.

Another advantageous feature of the closing mechanism 10 of the present embodiment is that the biasing assembly 22 is adapted to temporarily disconnect the belt drive 98 from the cable retractor 94 when opening the door or window. As discussed below, temporarily disconnecting the belt drive 98 from the cable retractor 94 will stop rotation of the belt drive 98 during rotation of the cable retractor 94 while opening the door 12. This will stop the speed control assembly 23 from affecting the rotational movement of the cable retractor 94 during opening of the door or window. This is particularly advantageous as it reduces wear and facilitates opening of the door or window.

A further advantage of the closing mechanism 10 is that it comprises a safety system which maintains a cable 30 in a tensioned state, including when located external the closing mechanism 10. The safety system together with guides 32 also help to avoid entanglement of the cable which pulls the door or window closed during the automatic closing process.

As discussed below, in a first arrangement the safety system comprises a weight attached to a distal end of cable 30. In a second arrangement, the safety system comprises a weight assembly which interacts with the cable 30. In both arrangements the weight and the weight assembly maintains the cable 30 in a tensioned state at all times. Other systems for maintaining the cable 30 tensioned may be envisaged by the person skilled in the art for inclusion in the closing mechanism of the present invention.

The closing mechanism 10 of the embodiment will now be described in further detail. Referring to FIG. 1, the closing mechanism 10 is shown attached to a sliding door 12 which slides with respect to a door frame 14 during the opening and closing of the door 12. The door frame 14 has a head 16 and a side jamb 18.

Referring to FIG. 2, the closing mechanism 10 is shown with a transparent cover in order to presently visualise and describe the inner mechanism of the closing mechanism 10.

As shown in FIG. 2, the closing mechanism 10 includes a housing 20 supporting the biasing assembly 22 and the speed control assembly 23 which are operatively connected with respect to each other. The fact that the biasing assembly 22 and the speed control assembly 23 are operatively connected with respect to each other permits the speed of the movement of the door 12 to be controlled during closing of the door 12.

In an arrangement, the biasing assembly 22 includes a spring system rotatably connected to the biasing assembly 22, at one end, and the bottom surface of the housing 20 at the other end. The spring system comprises a reel spring 26 (see FIGS. 5, 6, 23 and 24) which has a distal end connected to the housing 20, and a proximal end connected to a reel 28 (see FIG. 23).

The reel 28 is rotatably mounted relative to a central axle 24 permitting the reel 28 to rotate about the central axle 24 as it is driven by the reel spring 26 during opening and closing of the sliding door 12. During opening of the door 12 by a user, rotation of the reel 28 is driven by the force applied by the user when sliding open the door 12. The force applied by the user needs to be sufficient to overcome the biasing action of the reel spring 26. The reel 28 comprises a raised outer rim to ensure the cable 30 properly surrounds the reel 28 during operation of the closing mechanism 10.

The closing mechanism 10 is secured to a frame 15 of the sliding door 12. The closing mechanism 10 is operatively connected to the jamb 18 of the door frame 14 via a cable 30, the cable 30 having a distal end attached to the reel 28 and a proximal end attached to the jamb 18. As shown in the particular arrangement of FIGS. 1, 2, 5 to 13 and 19 to 24, the cable 30 comprises a distal end 34 having a weight in the form of a weighted ball 106 restrained by an eye screw 108, which in use is anchored to the side jamb 18 of the door frame 14.

When the door 12 is in the closed condition, the cable 30 is wound around the reel 28 with the reel spring 26 being unwound within the cable retractor 94. During opening of the door 12, the cable 30 is caused to unwind from the reel 28 with the reel spring 26 being wound, storing potential energy which is later used to assist in automatically closing the door 12. The cable 30 can be a string, rope, chain or any other type of line and is preferably made of a non-elastic material.

The cable 30 is unwound from the reel 28 during opening of the door 12 by the user, which moves the reel spring 26 from an unwound condition to a wound condition. During opening of the door 12, the cable 30 is pulled from the housing 20, applying a pulling force to the reel spring 26 thereupon winding the reel spring 26.

When the door 12 is permitted to close the cable 30 retracts into the housing 20, winding onto the reel 28 as the reel spring 26 releases the potential energy stored in the wound reel, whereupon the spring 26 returns to its unwound condition.

A number of cable guides 32 are located within the housing 20 to guide the cable 30 between the reel 28 and the outside of the housing 20, thereby to avoid the cable 30 from becoming entangled within the housing 20 during use and to help locate the cable 30 accurately onto the reel 28 with the aid of the raised outer rim of the cable retractor 94.

As will be described later herein, in accordance with embodiments of the invention there is provided a first arrangement of a safety cable system (see FIGS. 1, 2, 5 to 16 and 19 to 24) and a second arrangement of a safety cable system (see FIGS. 3, 17 and 18). Both first and second arrangements of safety cable systems 21 keep the cable 30 tensioned during operation of the closing mechanism 10 (either when closing or opening the door 12, or when keeping the door 12 open). This avoids slackness of the section of the cable 30 extending between the door 12 and the jamb 18 of the door frame 14. This minimizes the potential for the cable 30 to become entangled as well as forming a 'loop', which may represent a potential safety hazard to the users of the door 12.

In operation, to open the door 12 the user needs to apply a sufficient force to the door 12 (for example, by pulling the handle of the door 12) to extract the cable 30 from the reel 28. This extraction causes the reel 28 to rotate and consequently cause the reel spring 26 to wind up on itself around the central axle 24 (see FIG. 5) resulting in storage of a potential energy within the reel spring 26. The potential energy is then later used to automatically close the door 12.

During automatic closing of the door 12 (for example, by the user releasing the door handle of the door 12) the cable 30 is rewound on the reel 28 during rotation of the reel 28. Rotation of the reel 28 is driven by the fact that reel spring 26 is able to unwind once the user has removed the force used for opening or for keeping the door 12 open. Rewinding of the cable 30 around the reel 28 pulls the door 12 towards the side jamb 18, thereby closing the door 12.

The closing mechanism 10 is further provided with a braking assembly 40 to brake the biasing assembly 22 and prevent the door 12 from closing or further closing in case the door 12 had already been opened partially.

Figure 5:
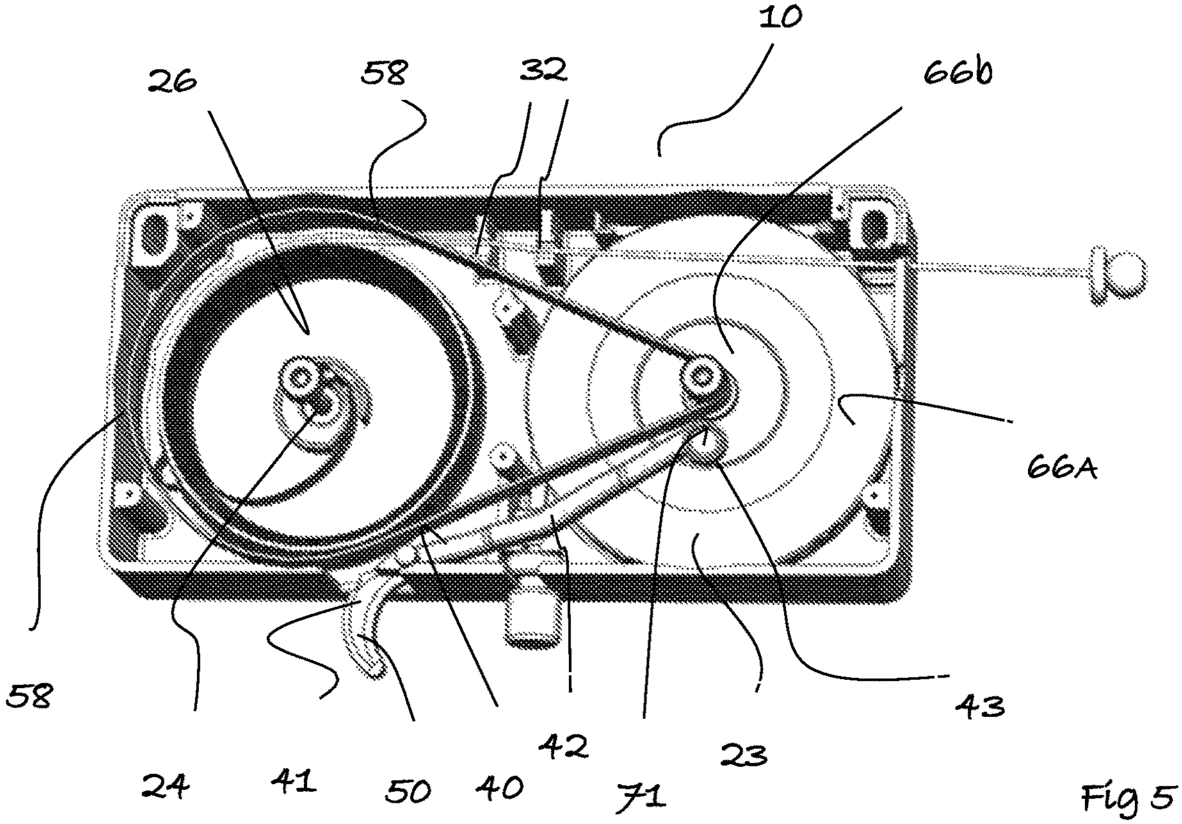
FIGS. 5 and 6 are top perspective views of the closing mechanism shown in FIG. 2, respectively, in the retracted and extended condition with the cover and various components removed to show the interior of a biasing assembly for illustration purposes.
Figure 6:
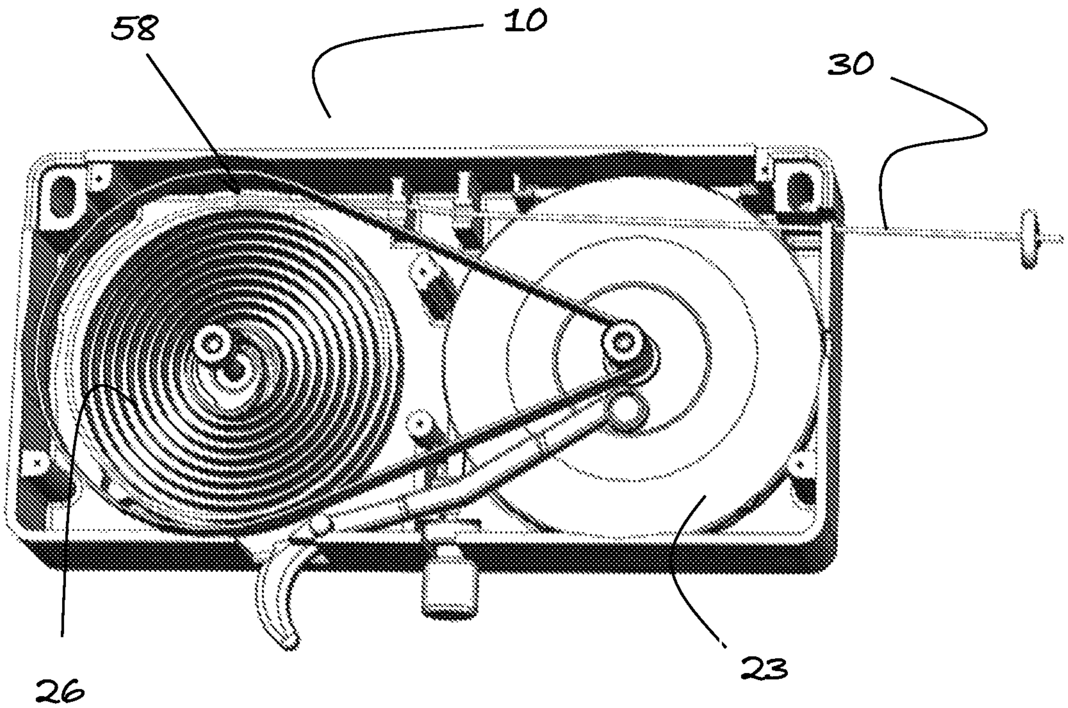
Figure 13:
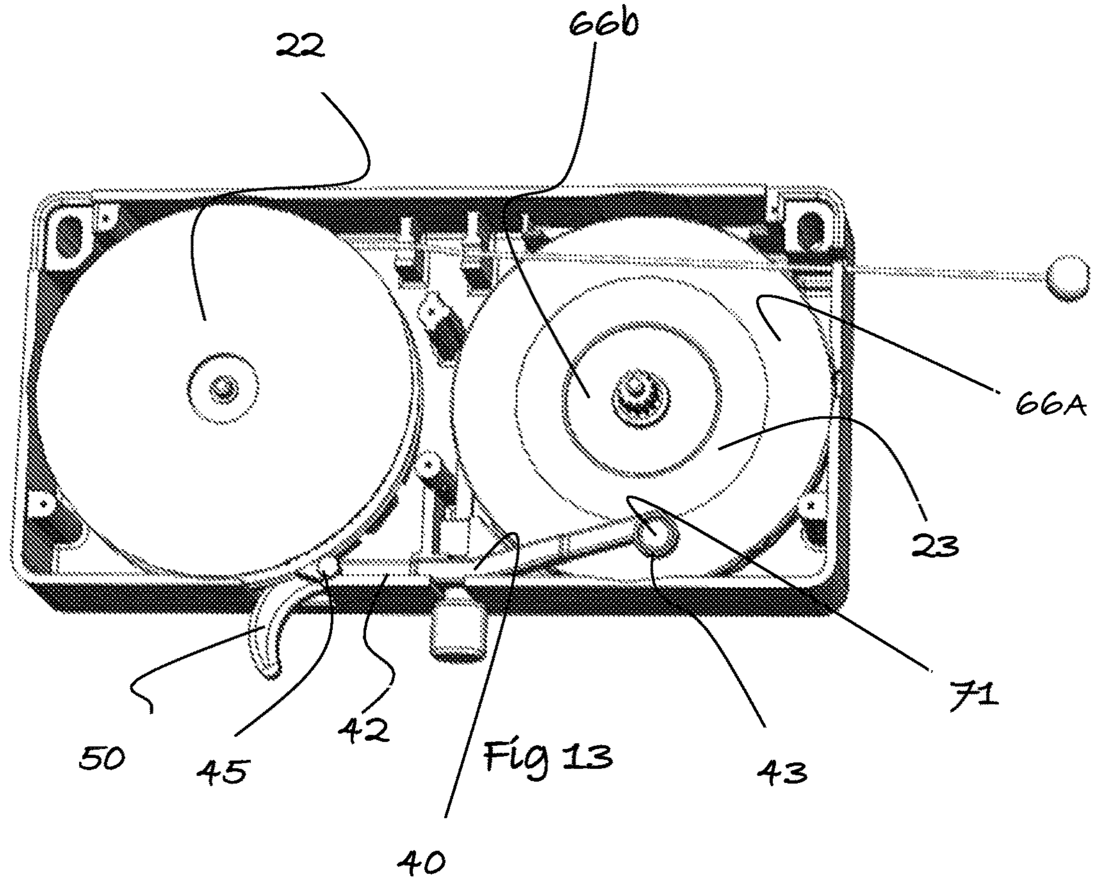
Figure 14:
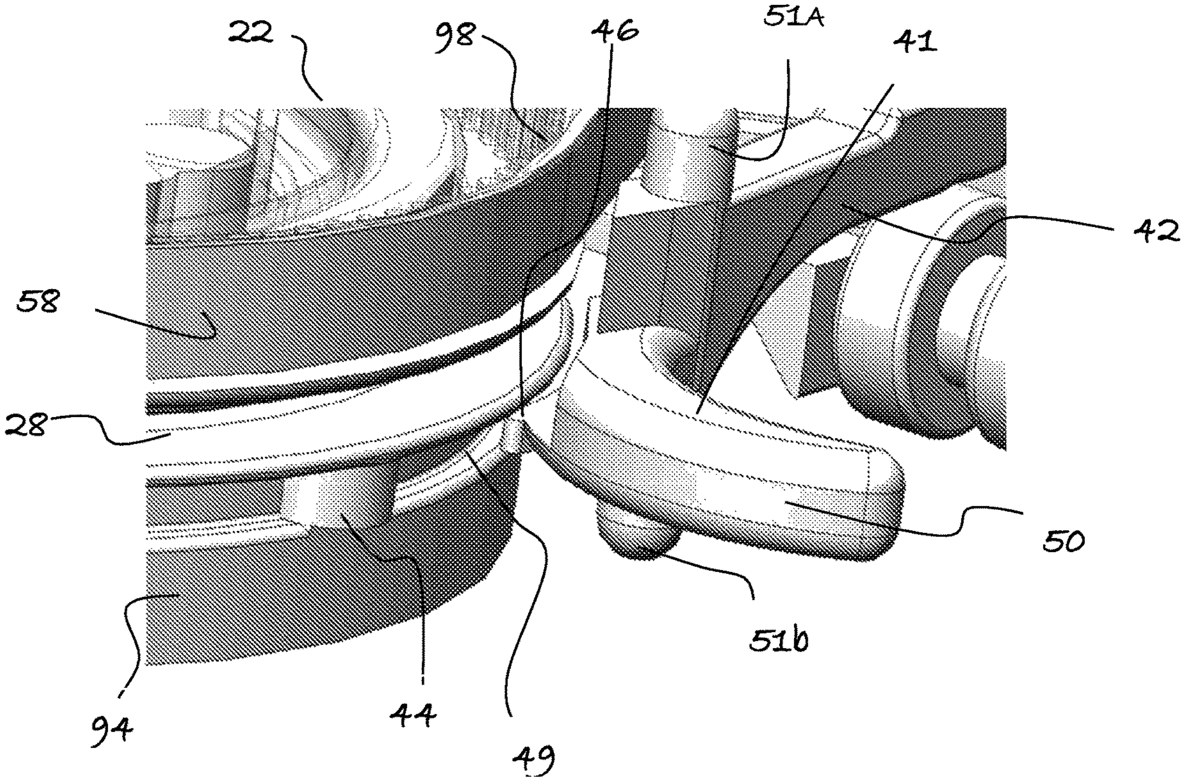
FIG. 14 is a close up view showing a section of the outer circumference of the biasing assembly prior engagement of the proximal end of the lever.

Referring to FIGS. 5 and 13, the braking assembly 40 comprises a lever 42 that is movable between (1) a disengaged condition, wherein a distal end 43 of lever 42 is disengaged from an outer washer 66*a* but is located above a metal portion of a restraining assembly, which is in the form of a magnetic restraining assembly 25, such as an inner washer 66*b* permitting normal operation of the closing mechanism 10, and (2) an engaged condition, wherein the distal end 43 of the lever 42 is engaged with the outer washer 66*a* thus located above magnets 70 of the magnetic restraining assembly 25 of the speed control assembly 23 (see FIG. 13), whereupon the closing mechanism is in a braked condition.

The distal end 43 of the lever 42 comprises a magnet 71. The magnet 71 is adapted to co-operate with the inner washer 66*b* when in vicinity therewith. In this manner, the lever 42 is maintained in the disengaged condition until a force is applied to the lever 42 by a user via a trigger 50 thereupon displacing the lever 42 to the engaged condition to place the closing mechanism in the braked condition.

Figure 15:
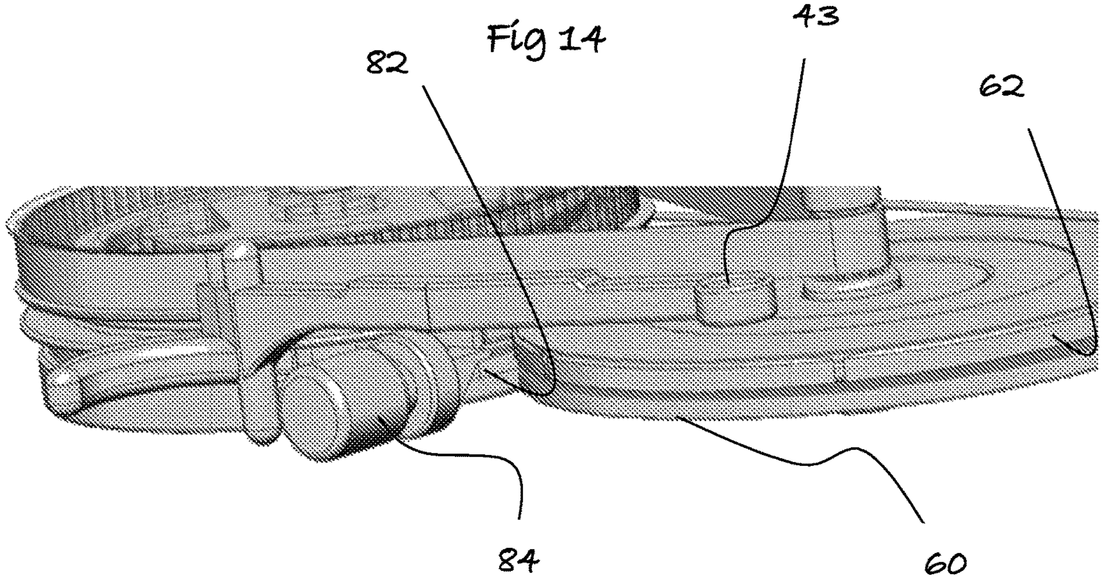
FIGS. 15 and **16*a*** are close up views of the restraining assembly without the closing mechanism housing for illustration purposes, showing a resistor plate, respectively, in the unpivoted and pivoted condition.

In the particular arrangement shown in the FIGS. 15 and 16, the distal end 43 is suspended above a magnet plate 62. This is particularly advantageous as it reduces wear and noise during operation of the closing mechanism.

While the biasing assembly 22 is in the braked condition, as shown in FIG. 13, a pawl 46 (see FIG. 14) of the lever 42 is located within a groove 49 formed in the reel 28. The groove 49 comprises a plurality of nodules 44 being arranged around the outer periphery of the reel 28 in a spaced apart relationship with respect to each other inside the groove 49. In an arrangement, there are six nodules 44 spaced apart with respect to each other within the groove 49.

The presence of the nodules 44 will, upon rotation of the biasing assembly 22, push the pawl 46 out of the groove 49 pivoting the lever 42 in order that the distal end 43 of the lever 42 is released from the magnetic force of the magnet plate 62 and displaced to the inner washer 66*b*. This will locate the closing mechanism in a released condition.

The lever 42 is pivotally attached to the housing 20 via a pivot joint 45 (see FIG. 13) permitting pivoting of the lever 42 for engagement and disengagement to occur. The pivot joint 45 is defined by two pins 51*a* and 51*b* adapted to enter into slots 53*a* and 53*b* of the housing 20 and cover 27, as shown in FIG. 23.

Further, the trigger 50 of the lever 42 extends from the proximal end of the lever 42 and extends to the exterior of the housing 20 so that a person (during operation of the closing mechanism 10) can grip the trigger 50 for locating the lever 42 either in the braked condition (as shown in FIG. 21) or the released condition (as shown in FIGS. 20, 22). Pivoting of the lever 42 may occur either manually via action of the user using the trigger 50 or automatically when the reels 28 starts rotating as described above.

In operation, when the door 12 has been opened (either fully opened or partially opened) by a user, the door 12 may be prevented from automatically closing. To prevent automatic closing of the door 12, the user may move (using the trigger 50) the braking system 40 into the braked condition by moving the proximal end 41 of the lever 42 so that the distal end 43 of the lever 42 is positioned above the magnets 70. This impedes rotation of the reel 28. Thus, the door 12 is kept opened in the position where the user stopped sliding the door 12 and actuated the braking assembly 40.

In order to either (1) close the door 12 or (2) further open the door 12 (in case the door 12 was previously only opened partially), the user may cause the door 12 to slide open resulting in the extension/pulling of the cable 30 from the housing 20. Pulling on the cable 30 will force the reel 28 to rotate resulting in the pawl 46 (which engages one of the nodules 44 located in the outer periphery of the reel 28) being ejected away from the reel 28. The closing mechanism 10 is then in the released condition, permitting the user to either allow automatic closure of the door 12, or to further open the door in case the door 12 was previously only opened partially.

As mentioned before, the door 12 may be kept partially open. A problem that may be encountered when manually closing a partially open door 12 is that the cable 30 will tend to become slack and hang under its own weight, forming a loop between the partially opened door 12 and the side jamb 18 of the door frame 14. The cable 30 may also become slack and hang under its own weight forming a loop, when the door 12 is manually closed whilst the brake is engaged. The presence of the loop may be a safety hazard for persons that pass through the door frame 14 when the door 12 is partially opened. It is for this reason that the closing mechanism 10 comprises a cable safety system 21, a first arrangement being shown in FIGS. 1, 2, 5 to 16 and 19 to 24, while a second arrangement is shown in FIGS. 3, 17 and 18. The cable safety system 21 ensures that the cable 30 does not become slack to form the loop.

FIGS. 17 and 18 show a closing mechanism 10 incorporating the second arrangement of the safety cable system 21. The second arrangement of safety cable system 21 comprises a weight 52 (acting as a ballast) adapted to hang from the cable 30 via a tether 54. The function of the weight 52 is to keep the cable 30 extended and tensioned when the door 12 is at least partially opened. In those circumstances in which the door is fully opened or close thereto, the cable 30, if not held in tension, could cause a hazard to people passing through the doorway. In other embodiments the configuration of the weight 52 can take different forms. For instance, the weight 52 may be located external the housing 20. It may also be located at the end of the cable 30, as described in more detail in the below embodiment, It is to be appreciated that other mechanisms can be used to keep the cable 30 extended and tensioned, these being readily understood by the person skilled in the art. These mechanisms can include springs, resilient elements and other devices capable of elastic deformation.

In the particular arrangement shown in FIGS. 17 and 18, the weight 52 is located adjacent the wall of the housing 20 that includes an opening 56 for the cable 30 to pass through.

Further, the housing 20 includes an opening 56 which is positioned such that the weight 52 can exit the housing 20 as the cable 30 becomes slack, resulting in the weight 52 passing out of the housing 20, as shown in FIG. 18.

The weight 52 ensures that the section of the cable 30 located outside of the closing mechanism 10 is kept extended and tensioned so as not to form a loop. As the weight 52 hangs from the cable 30, a downward force is applied thereto, (as shown in FIG. 18) ensuring that the section of the cable 30 located outside of the closing mechanism 10 has a force applied continuously thereto preventing the cable 30 from becoming slack and potentially forming a loop.

FIG. 18 shows that, as the weight 52 applies the pulling force, a loop is formed as the weight 52 is lowered. In view that the closing mechanism 10 may be attached to the door 12, the loop that is formed due to the weight 52 does not present a safety hazard as the loop would be hanging in front of the door and not between the opened door and the jamb 18 of the door frame 14.

In accordance with the present embodiment of the invention the closing mechanism 10 is adapted to prevent the door 12 from slamming closed against the side jamb 18 as the door 12 automatically closes due to action of the closing mechanism 10.

As mentioned earlier, in accordance with a particular arrangement of the present embodiment, the closing mechanism 10 is adapted to control the speed at which the door closes, permitting users to vary the speed at which the door or window closes depending on particular preferences and/or circumstances.

Control of the speed of the door 12 when the door 12 automatically closes is accomplished due to the speed control assembly 23 being operatively connected to the biasing assembly 22. In this regard the speed control assembly 23 provides resistance to rotation of the biasing assembly 22. The biasing assembly 22 comprises the belt drive 98 and the reel 28, wherein the belt drive 98 sits on reel 28.

As shown in FIG. 2, the biasing assembly 22 is operatively connected via a belt 58 to the speed control assembly 23. Thus, the speed of rotation of the reel 28 will be restrained due to the resistance provided by the speed control assembly 23.

In the particular arrangement of the figures, the speed control assembly 23 comprises the magnetic restraining assembly 25 (see FIG. 10) which is adapted to provide resistance to the rotation of the reel 28. In particular, the magnetic restraining assembly 25 comprises a magnetic eddy current assembly adapted to limit movement of the rotational speed of an axle cog 92 of a magnetic plate 62 to which the transmission belt 58 is attached. The resistance offered by the magnetic eddy current assembly restrains the rotational speed of the reel 28 (as it is connected to the rotating magnetic plate 62). This will control the speed at which the cable 30 exits the closing mechanism 10 resulting in a reduction in the speed of the cable retractor 94 and therefore the door 12 when being closed automatically.

Referring now in particular to FIGS. 23 and 24, the inner makings of the closing mechanism 10 which incorporates the first arrangement of the safety cable system 21 are shown.

The magnetic restraining assembly 25 comprises a plurality of plates adapted to be joined together. In particular, the magnetic restraining assembly 25 comprises a resistor plate 60 and the magnet plate 62 as well as a first washer 64 and second washers 66*a* and 66*b* sandwiching the resistor plate 60 and the magnet plate 62.

The first washer 64 is located below the resistor plate 60 improving the polarity and therefore increase the restraining force that the speed control assembly 23 is capable to attach to the biasing assembly 22. The second washers 66 comprise concentric outer and inner washers 66*a* and 66*b*. The outer washer 66*a* covers the magnets 70 increasing the magnetic polarity and therefore increasing the restraining force that the speed control assembly 23 is capable to attach to the biasing assembly 22.

The magnet plate 62 comprises a plate 68 adapted to receive the plurality of magnets 70 (such as permanent magnets, for example, neodymium magnets). In particular, the plate 68 comprises indentations arranged in a spaced apart relationship with respect to each other. Each indentation is adapted to receive a magnet 70. This arrangement of the magnet plate 62 is particularly advantageous because the faces of the magnets 70 are exposed at both sides of the plate 68 defining the magnet plate 62. Each magnet 70, in the particular arrangement shown in the figures, comprises disc-shaped bodies with their ends comprising opposite poles, in particular a north pole and a south pole.

In a particular arrangement, there are a plurality of magnets 70 arranged in a spaced apart relationship with respect to each other along the magnetic plate 62. In other arrangements, the number of magnets 70 may be in multiples of 2.

Figure 3:
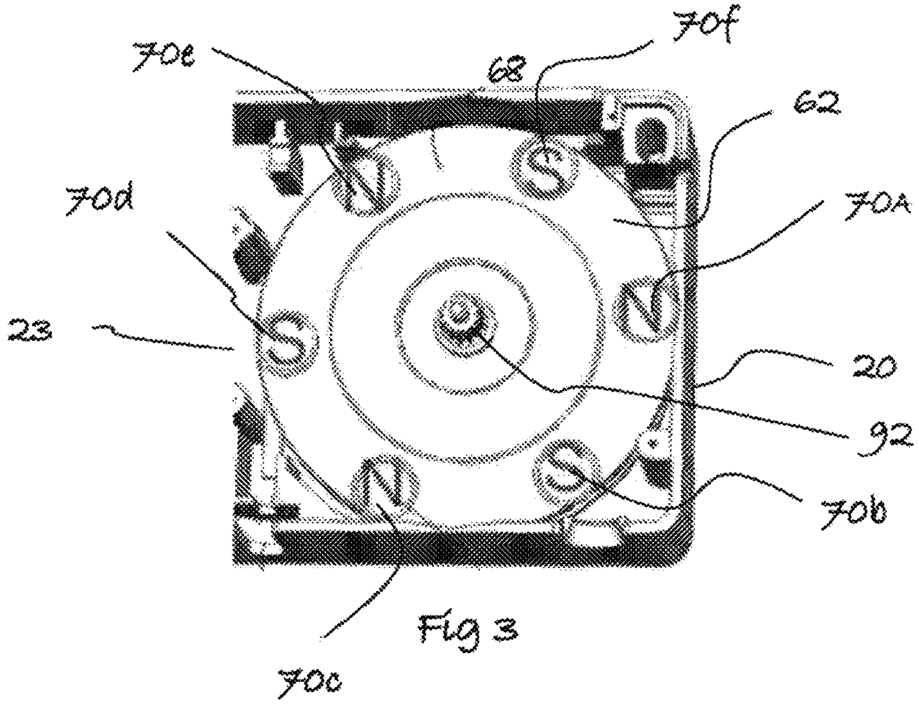
FIG. 3 is a partial view of FIG. 2 with components removed to show a magnetic plate of a restraining assembly illustrating the particular orientation of each magnet of the magnetic plate.

Referring to FIG. 3, each magnet 70 (e.g., 70*a*) is located between neighbouring magnets 70 (e.g. 70*f* and 70*b*) wherein the neighbouring magnets 70 (70*f* and 70*b*) have their north poles facing opposite to the north pole of each adjacent magnet 70 (e.g., 70*a*) located between the neighbouring magnets 70 (70*f* and 70*b*). This alternating arrangement of neighbouring magnets 70, being oriented such that their north poles facing opposite with respect to each other, strengthens the eddy currents induced during rotation of the magnetic plate 62, therefore increasing the restraining force that the speed control assembly 23 is capable to apply to the biasing assembly 22.

Figure 9:
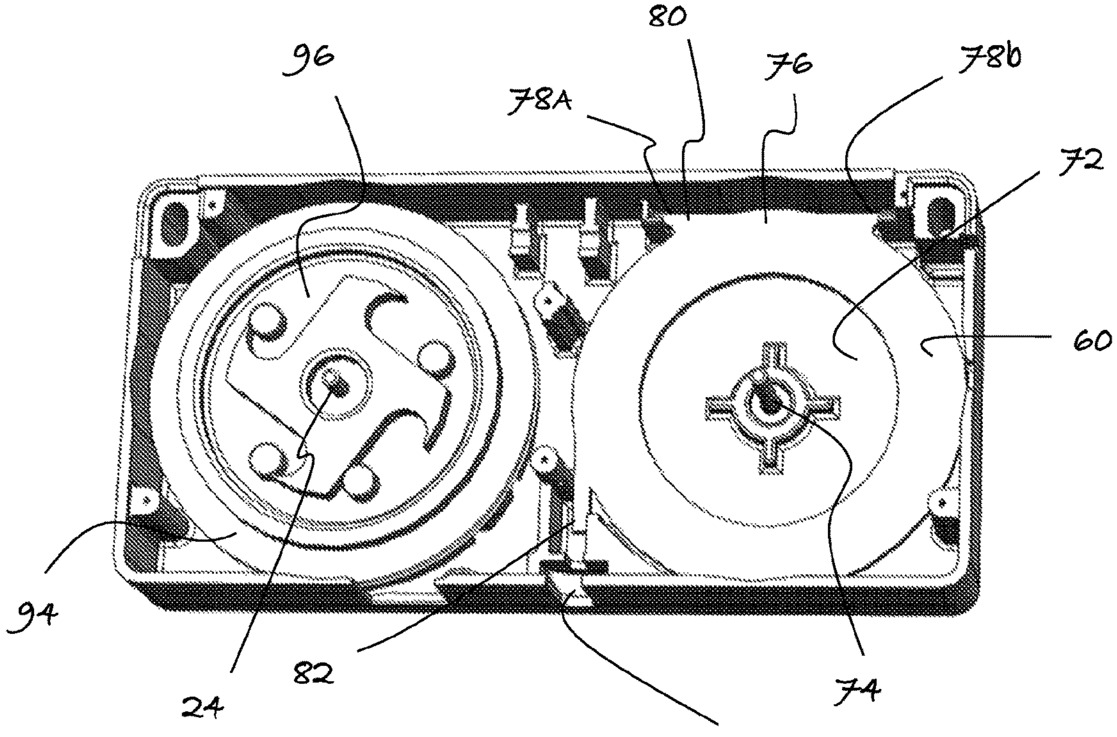
FIGS. 9 to 11 are top perspective views of the closing mechanism shown in FIG. 2 with the cover and various components removed for illustration purposes to show assembly of the magnetic restraining assembly.

As shown in FIGS. 9 and 23, the resistor plate 60 is configured as a washer comprising a ring-shaped body defining an inner clearance 72 allowing passage of axle 74 for connecting with the magnet plate 68. Further, the resistor plate 60 comprises a formation 76 configured with extensions extending sideways defining pins 78*a* and 78*b*. The formation 76 including the pins 78*a* and 78*b* are adapted to be received within a compartment 80 defined on an inner side of the housing 20 as shown in FIG. 9.

With reference to FIG. 9 which is a top perspective view of the closing mechanism, shown in FIG. 1, with the cover, belt drive 98, belt 58, magnetic plate 62, and lever 42 removed for illustration purposes. FIG. 9 shows a sprag clutch 96 with cable retractor 94 on the left, and the resistor plate 60 on the right.

Figure 10:
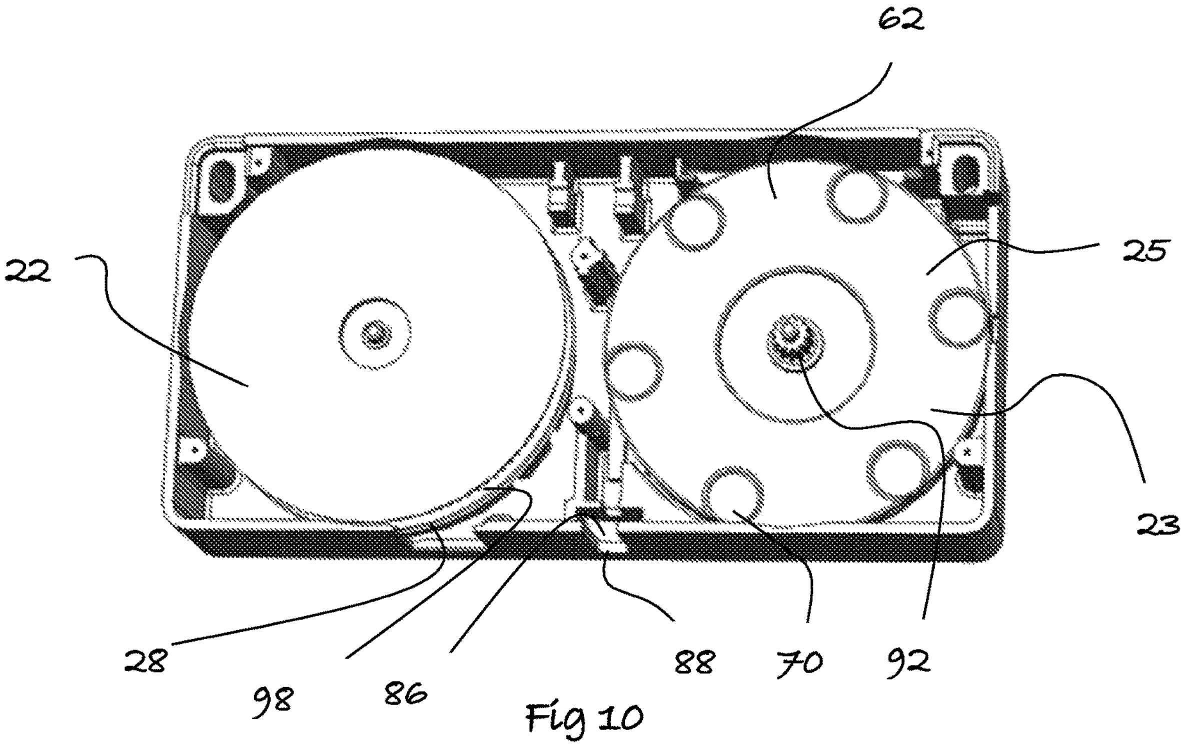

FIG. 10 is a top perspective view of the closing mechanism, shown in FIG. 1, with the cover, belt 58, washer 64 and lever 42 removed for illustration purposes and showing the biasing assembly 22, on the left, and speed control assembly 23 (without washer 64), on the right.

Figure 11:
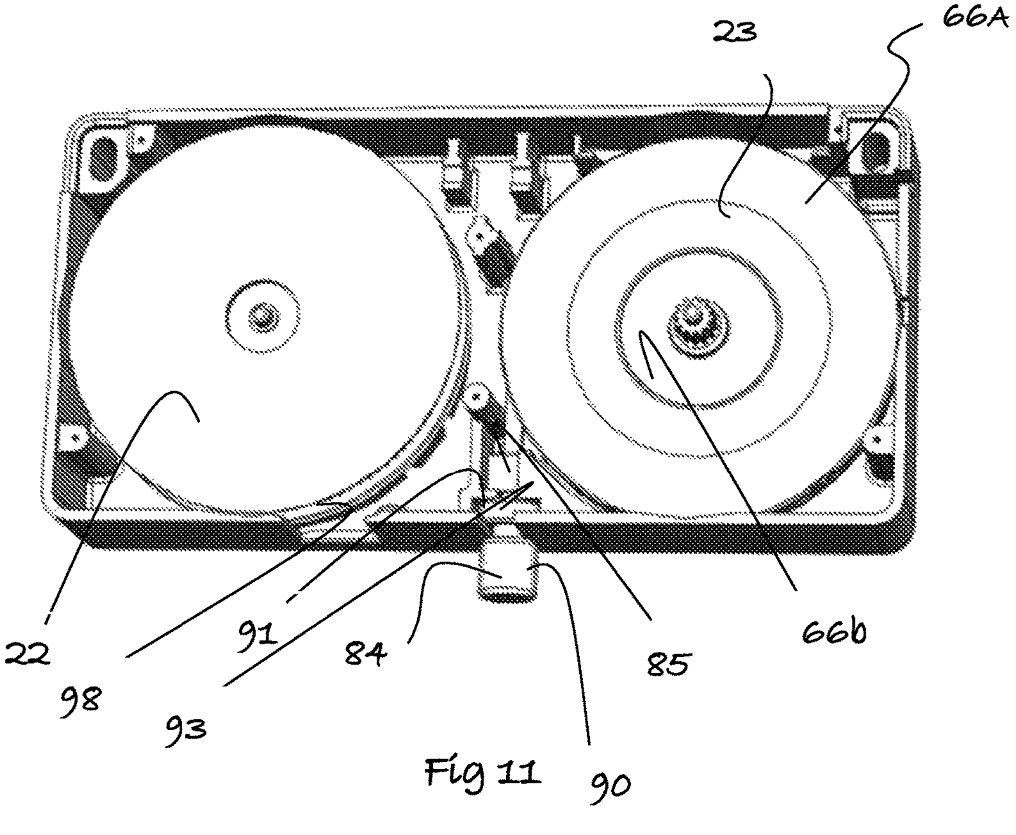
Figure 12:
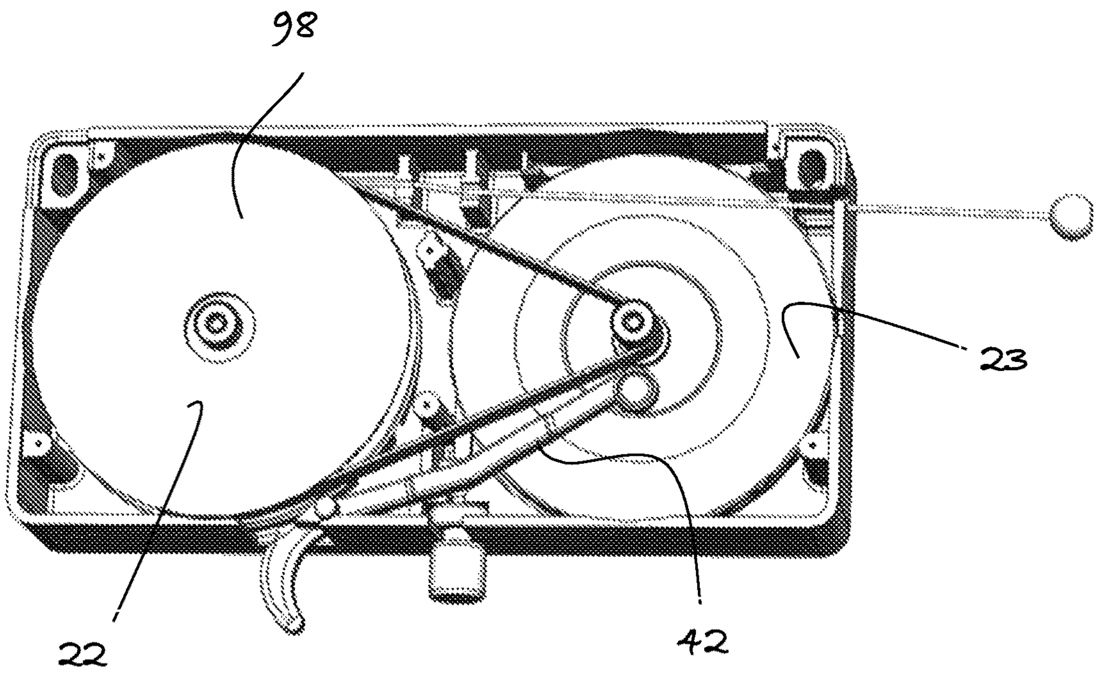
FIGS. 12 and 13 are top perspective views of the closing mechanism shown in FIG. 2, respectively, in the released and braked condition via a lever with the cover and various components removed for illustration purposes.

FIG. 11 is a top perspective view of the closing mechanism, shown in FIG. 1, with the cover, belt 58 and lever 42 removed for illustration purposes and showing the biasing assembly 22, on the left, and speed control assembly 23, on the right.

As will be described with reference to the method of operation of the speed control assembly 23, this particular arrangement of resistor plate 60 is adapted to be pivoted at a particular angle with respect to the magnet plate 62 enabling the distance between the magnet plate 62 and the resistor plate 60 to be varied. This allows the amount of resistance provided to the biasing assembly 22 by the speed control assembly 23 to be varied/adjusted. In particular, as the resistor plate 60 pivots away from the magnet plate 62 resistance is reduced. By varying the distance between the magnet plate 62 and the resistor plate 60, the speed at which the door is closed may be varied.

Figure 16A:
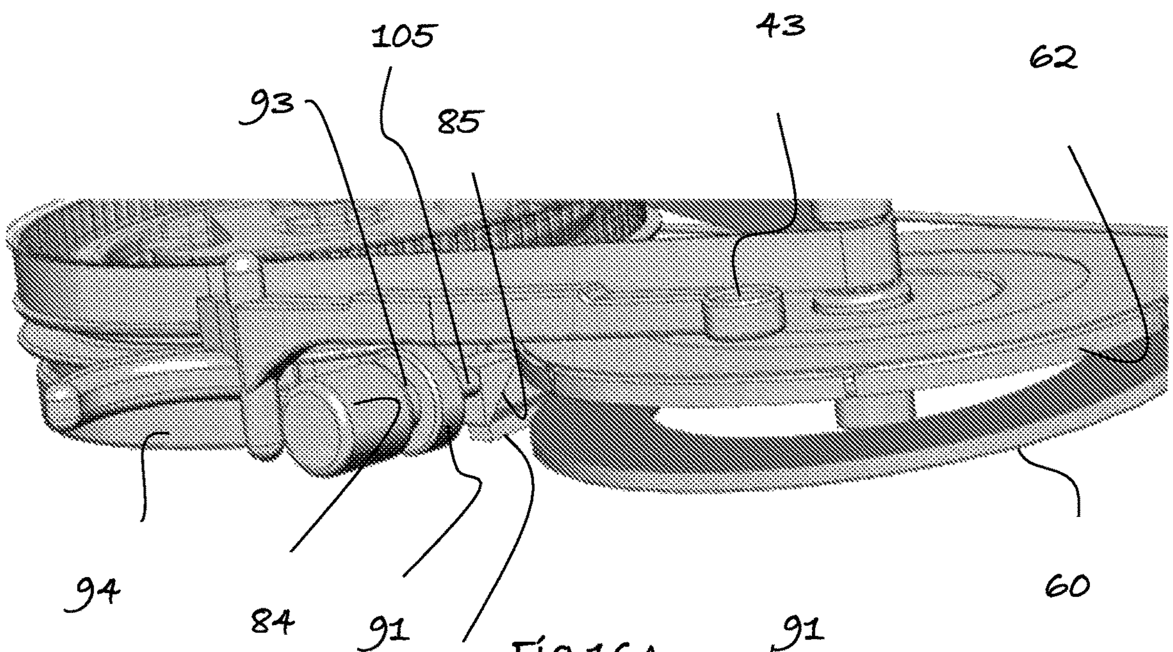
Figure 16B:
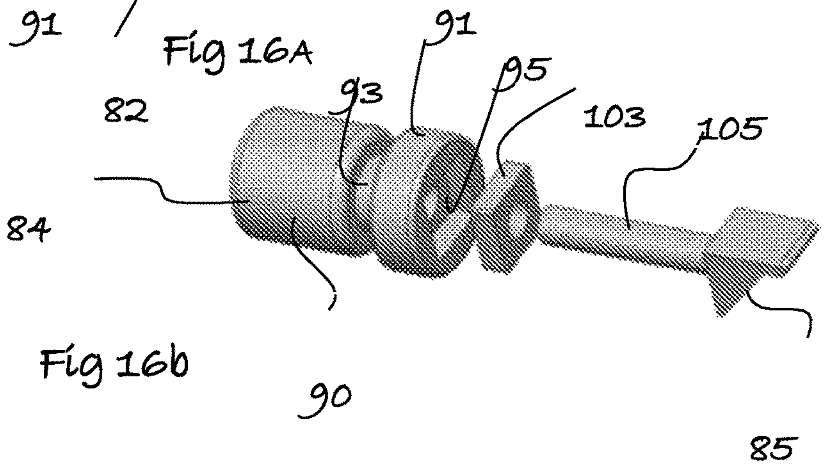

Referring now to FIGS. 15, and 16*a* and 16*b*, the resistor plate 60 comprises an arm extension 82 extending tangentially away from the outer periphery of the resistor plate 60.

An adjuster screw 84 is part of the closing mechanism 10. The arm extension 82 together with the adjuster screw 84 and a ramp member 85 permits the resistor plate 60 to be pivoted either away from the magnet plate 62 or closer to the magnet plate 62.

In the particular arrangement shown in the figures, the adjuster screw 84 comprises a knob 90 and a head 91 spaced apart from the knob 90 via a union 93 of reduced diameter. As shown in FIGS. 10 and 17, the union 93 is adapted to be received in opening 88 of the housing 20 so that the head 91 may located within a compartment 86. In this manner, the adjuster screw 84 is attached to the housing 20 with the knob 90 located outside the housing 20 and the head 91 located within the compartment 86 as can be seen in FIG. 17.

Referring to FIG. 16*b*, the head 91 comprises an opening 95 for receiving a nut 103. In the arrangement shown in the figures, the nut 103 comprises a square body and the opening 95 has a square configuration. In other arrangements, the nut 103 and opening 95 may be configured as having any shape that impedes the nut 103 from rotating within the opening 95. In this manner, the nut 103 is axially fixed within the opening 95 ensuring that the nut 103 rotates with the screw adjuster 84 during rotation of the knob 90 by a user of the closing mechanism 10.

The ramp member 85 comprises a screwed end 105 adapted to be received by the nut 103 and at least partially by the union 93 and knob 90.

During rotation of the adjuster screw 84 either clockwise or counterclockwise, the screwed end 105 will, respectively, (1) move the ramp member 85 onto the arm extension 82, pivoting the resistor plate 60 away from the magnet plate 62 as shown in FIG. 16*a* or (2) move the ramp member 85 away from the arm extension 82, returning the resistor plate 60 closer to the magnet plate 62 as shown in FIG. 15.

In particular, pivoting the resistor plate 60 with respect to the magnet plate 62 is accomplished by rotating the adjuster screw 84. As shown in FIGS. 15 and 16*a*, when the adjuster screw 84 winds towards the interior of the housing 20, the inclined surface of the ramp member 85 displaces the resistor plate 60 away from the magnet plate 62 reducing the resistance provided to the rotation of the reel 28 of the biasing assembly 22. By winding the adjuster screw 84 away from the housing 20, the resistor plate 60 will return closer to the magnet plate 62, increasing the resistance provided to the rotation of the reel 28 of the biasing assembly 22.

When setting up the closing mechanism 10 the installer/user may adjust the mechanism so that the door closes at a desired speed. In this regard the installer/user may manipulate the knob 90 to vary the distance between the resistor plate 60 and the magnet plate 62, thereby varies the speed that the door 12 will close during operation of the closing mechanism 10.

Referring to FIG. 10, the magnet plate 62 is adapted to rotate about an axle 74 attached to the housing 20. As mentioned before, the magnet plate 62 is adapted to be operatively connected to the biasing assembly 22 via the transmission belt 58. As shown in FIGS. 2 and 3, the magnetic plate 62 comprises an axle cog 92 for receiving the transmission belt 58.

In operation, by means of the transmission belt 58, rotation of the reel 28 of the biasing assembly 22 rotates the magnetic plate 62 at particular speeds with respect to the resistor plate 60. These particular speeds are of such a magnitude that induce eddy currents. Rotation of the magnetic plate 62 with respect to the resistor plate 60 at the particular speeds, induces eddy currents, which generate a magnetic field that applies a repulsion force to the permanent magnets 70 of the magnetic plate 62 thus reducing the rotation speed of the magnetic plate 62. In this manner, the speed control assembly 23 is able to control the rotational speed of the reel 28 resulting in a reduction of the speed of the door 12 when being automatically closed.

As mentioned above, the magnetic plate 62 rotates at particular speeds, which are of such a magnitude that eddy currents are formed. In the particular arrangements of the figures, the ratio from the diameter of the belt drive 98 to the axle cog 92 are such that the magnetic plate 62 rotates at these particular speeds-see for example, FIG. 7. The strength of the magnetic field varies according to speed of rotation, number and strength of the magnets 70 as well as the magnets 70 distance from the resistor plate 60.

Referring now to FIGS. 23 and 24, the biasing assembly 22 comprises a cable retractor 94 including the reel spring 26 and the reel 28, the sprag clutch 96 and the belt drive 98.

The cable retractor 94 and the belt drive 98 may work in unison when closing the door 12.

In contrast, when opening the door 12, the belt drive 98 is disengaged from the cable retractor 94. In this condition, during opening of the door 12, the cable retractor 94 disengages the belt drive 98 resulting in the transmission belt 58 not driving the speed control assembly 23. This is particularly advantageous as it reduces wear due to lesser parts being in operation, as well as reducing resistance offered when opening the door 12 as the speed control assembly 23 is not operating (due to the belt drive 98 having been temporarily disengaged from the cable retractor 94).

The selective disengagement and engagement between the cable retractor 94 and the belt drive 98 is due to the sprag clutch 96.

Figure 8:
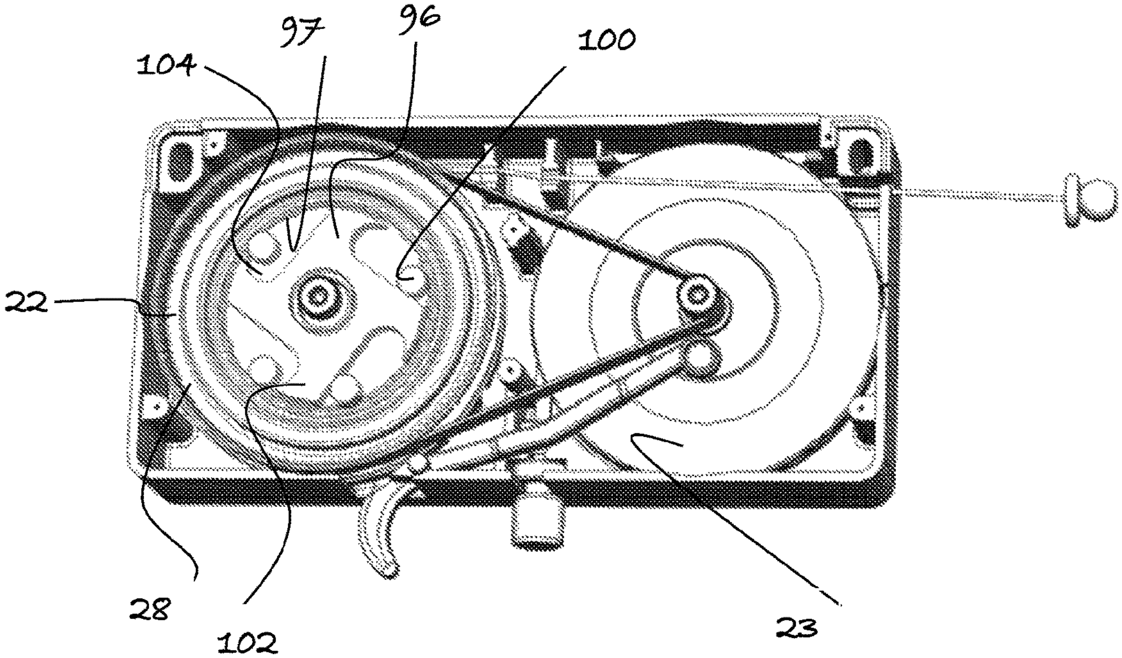

The sprag clutch 96 is adapted to be selectively displaced between a retracted condition (as shown in FIG. 7) and an engaged condition (as shown in FIG. 8). In the retracted condition, the cable retractor 94 is disengaged from the belt drive 98. In the engaged condition the cable retractor 94 is engaged to the belt drive 98.

Referring to FIGS. 7 and 8, the sprag clutch 96 comprises a plurality of tubular wedges 100 which, when in the retracted condition (as shown in FIG. 7), result in disengagement of the belt drive 98 with respect to the cable retractor 94. When the tubular wedges 100 are in the engaged condition (as shown in FIG. 8) the belt drive 98 and cable retractor 94 are engaged with each other via the sprag clutch 96.

As shown in FIGS. 8, the tubular wedges 100, while being in the retracted position, are kept in place by a hooked plate 102 (pawl 102) defining recesses 104 (see FIG. 8) for receiving the tubular wedges 100. During opening of the door 12, the sprag clutch 96 rotates resulting in the tubular wedges 100 being kept within the recesses 104 and resulting in the cable retractor 94 disengaging from the belt drive 98. When closing the door 12, the sprag clutch 96 rotates in the opposite direction (with respect to the rotation of the sprag clutch 96 during opening of the door 12) resulting in the tubular wedges 100, being released from the recesses 104 due to the centrifugal force (as shown in FIG. 8). This results in the tubular wedges 100 abutting the wall 97 (surrounding the pawl 102 as shown in FIG. 8) and engaging the wall 97 results in the cable retractor 94 engaging the belt drive 98. Rotation of the belt drive 98 drives the magnetic plate 62 of the speed control assembly 23, which results in rotational movement of the cable retractor 94 being restrained, reducing the speed at which the door 12 automatically closes.

Figure 4:
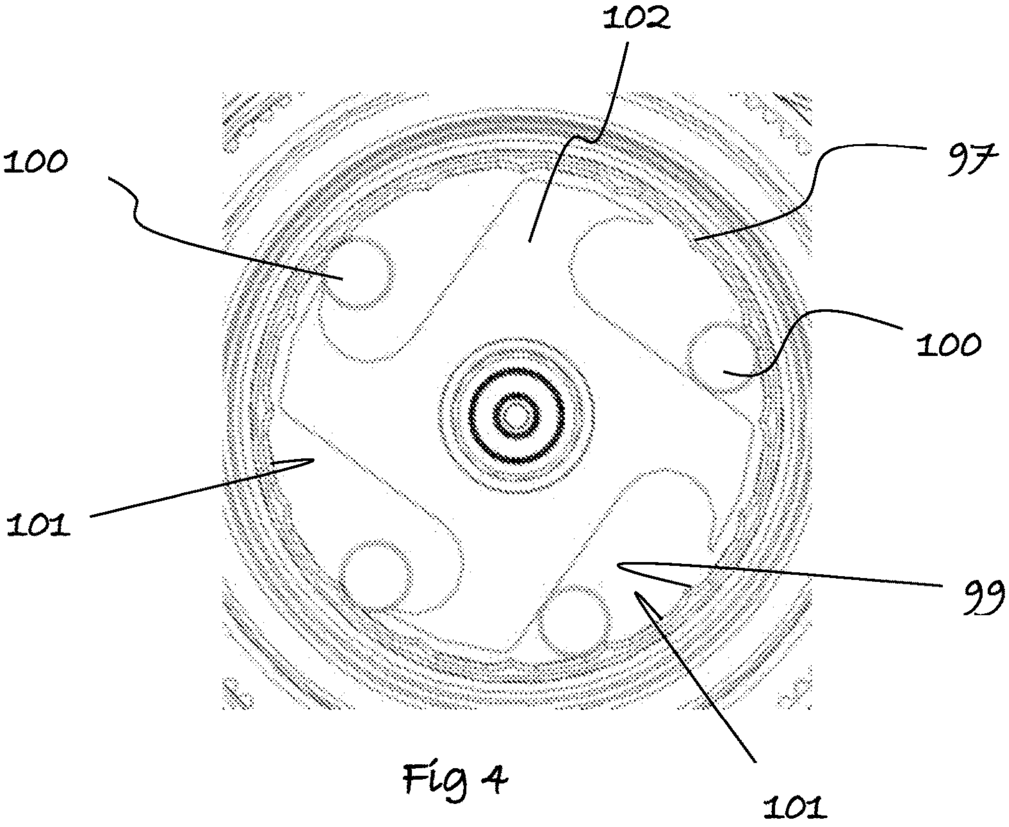
FIG. 4 is another partial view of FIG. 2 with various components removed to show a sprag clutch in an engaged condition.

As shown in FIG. 4, the wall 97 surrounding the pawl 102 comprises an inner surface having a plurality of valleys 101 and ridges 99. This configuration (1) allows a more positive engagement between the inner surface (in particular the ridges 99) and the tubular wedges, and (2) allows smoother release of the tubular wedges 100 from the valleys 101 and ridges 99 as the door 12 is opened and the sprag clutch 96 is in the disengaged condition, whereupon the speed control assembly 23 is not operating to facilitate opening of the door 12. The valleys 101 and ridges 99 facilitate greater control and enhanced operation of the closing mechanism 10.

FIGS. 1, 2, 5 to 16 and 19 to 24 show the first arrangement of cable safety system 21. The first arrangement of cable safety system 21 comprises a weighted ball 106 attached to the proximal end of the cable 30 to be attached to the proximal end 34 of cable 30, which is attached to the jamb 18 of the door frame 14. The proximal end of the cable 30 slots through an eye screw 108 mounted on the jamb 18.

The weighted ball 106 is designed to be a safety feature by the way of pulling the cable 30 downward if the cable 30 becomes slack as shown in FIG. 21. The slackness of the cable 30 may occur, for example, in the particular circumstances where the door 12 is being closed whilst the closing mechanism 10 is in the braked condition. If the closing mechanism 10 is in the braking condition and, unless the door 12 is opened for locating the closing mechanism 10 into the released condition, the closing mechanism 10 will remain in the braked condition, which will result in the cable 30 not being able to retract back onto the spool. This results in the cable 30, during closing of the door 12, dropping down toward the middle of the opening of the door 12 and potentially become a loop. The cable safety system 21 as shown in FIGS. 1, 2, 5 to 16 and 19 to 24 have the weighted ball 106, activated by gravity, to pull the cable down parallel to the jamb 18 avoiding the formation of a loop and therefore reducing the risk of choking a user using the door 12.

In a particular arrangement, the weighted ball 106 is constructed of metal and adapted to be tied to the proximal end 34 of the cable 30.

During installation of the closing mechanism onto the door 12, the eye screw 108 is screwed to the door jamb 18 with the loop of the eye screw 108 facing downward. Once the closing mechanism 10 and the eye screw 108 have been installed (see FIG. 20), the cable 30 is pulled out of the closing mechanism 10 and slipped through a gap 109 (see FIG. 19) in the eye screw 108. The weighted ball 106 then will rest up against the outer edge of the eye screw 108 as shown in FIG. 21.

In another arrangement as shown in FIG. 25, instead of the biasing assembly comprising a sprag clutch, it comprises a one way bearing 111 for connecting the belt drive 98 and the cable retractor 94 with respect to each other, the one way bearing being adapted to be selectively move between an unlocked rotation condition wherein the bearing is free to rotate wherein the cable retractor is disengaged from the belt drive, and an locked condition wherein the cable retractor is engaged with the belt drive.

While the present embodiments particularly discuss the closing mechanism as applied to a sliding door, a person skilled in the art will understand that the present invention can be readily used to close any opening. Such variations are considered to be within the scope of the present invention.

Modifications and variations as would be apparent to a skilled addressee are deemed to be within the scope of the present invention.

Further, it should be appreciated that the scope of the invention is not limited to the scope of the embodiments disclosed. These embodiments are intended for the purpose of exemplification only. Functionally equivalent products, formulations and methods are clearly within the scope of the invention as described herein.

Reference to positional descriptions, such as lower and upper, or inner and outer, are to be taken in context of the embodiments depicted in the figures, and are not to be taken as limiting the invention to the literal interpretation of the term but rather as would be understood by the skilled addressee.

The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprise", "comprises," "comprising," "including," and "having," or variations thereof are inclusive and therefore specify the presence of stated features, integers, steps, operations, elements, and/or components, but do not preclude the presence or addition of one or more other features, integers, steps, operations, elements, components, and/or groups thereof.

Although terms such as first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath", "below", "lower", "above", "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The invention claimed is:

1. A closing mechanism for automatically closing a door which slides within a door frame, the door frame having a side jamb, the closing mechanism comprising: a biasing assembly having a cable retractor for selectively winding or unwinding a cable thereon during rotation of the cable retractor, the cable being adapted to be extended between the door and the side jamb when the door is in an open condition; and a speed control assembly having a magnetic restraining assembly, the cable retractor and the speed control assembly being operatively connected with respect to each other for restraining rotational speed of the cable retractor, wherein the magnetic restraining assembly is adapted to control the amount of restraint to be provided to rotational movement of the cable retractor.

2. The closing mechanism according to claim 1 wherein the magnetic restraining assembly comprises a magnetic plate and a resistor plate arranged in a spaced apart relationship with respect to each other for generating eddy currents during movement of the magnetic plate and resistor plate with respect to each other, wherein the magnetic restraining assembly is adapted to vary the spacing between the magnetic plate and the resistor plate to control the amount of resistance to be applied by the magnetic restraining assembly to the cable retractor.

3. The closing mechanism according to claim 1 wherein the magnetic restraining assembly comprises a resistor plate and a magnet plate arranged in a spaced apart relationship with respect to each other, wherein the resistor plate is adapted to pivot with respect to the magnet plate to vary the distance between the magnet plate and the resistor plate.

4. The closing mechanism according to claim 3 wherein the magnetic restraining assembly further comprises metal portion such as a first washer and second washers sandwiching the resistor plate and the magnet plate.

5. The closing mechanism according to claim 4 wherein the first washer is located below the resistor plate, and the second washers comprise concentric outer and inner washers.

6. The closing mechanism according to claim 3 wherein the closing mechanism comprises a housing adapted to receive the cable retractor and the speed control system to permit rotational movement of the cable retractor and rotational movement of the magnet plate.

7. The closing mechanism according to claim 6 wherein the resistor plate is adapted to be pivotally attached to a section of the housing permitting pivotal movement of the resistor plate with respect to the magnet plate.

8. The closing mechanism according to claim 3 wherein the closing mechanism further comprises means for the user to engage with the resistor plate for varying the distance between the resistor plate and the magnet plate, wherein the resistor plate comprises an arm extension extending tangentially away from the outer periphery of the resistor plate for engagement with the means for the user to engage with the resistor plate.

9. The closing mechanism according to claim 8 wherein the means for the user to engage with the resistor plate comprises an adjuster screw having a distal end configured as an inclined ramp for engagement with the arm extension.

10. The closing mechanism according to claim 9 wherein the adjuster screw is adapted to be slidably attached to the housing of the closing mechanism.

11. The closing mechanism according to claim 3 wherein the resistor plate comprises a formation configured with extensions defining pins adapted to be received within a compartment defined in the housing to allow pivotal movement of the resistor plate.

12. The closing mechanism according to claim 3 wherein the magnetic restraining assembly comprises outer washers sandwiching the magnet plate and the resistor plate therebetween.

13. The closing mechanism according to claim 3 wherein the resistor plate is adapted to be pivoted by a user of the closing mechanism to pivot the resistor plate at a particular angle with respect to the magnet plate.

14. The closing mechanism according to claim 3 wherein the magnet plate comprises indentations arranged in a spaced apart relationship with respect to each other, each indentation being adapted to receive a magnet.

15. The closing mechanism according to claim 14 wherein there are a plurality of magnets assembled into the magnet plate in a spaced apart relationship, wherein adjacent magnets have alternating poles.

16. The closing mechanism according to claim 3 wherein the resistor plate is configured as a washer comprising a ring-shaped body.

17. The closing mechanism according to claim 1 wherein the closing mechanism further comprises a braking assembly to brake the biasing assembly, wherein the braking assembly is adapted to disengage the cable retractor during starting of the rotational movement of the cable retractor.

18. The closing mechanism according to claim 17 wherein the braking assembly comprises a lever being movable between a disengaged position, and an engaged position, wherein a distal end of the lever is adapted to be engaged with the magnetic plate for preventing movement of the cable retractor.

19. The closing mechanism according to claim 18 wherein the distal end comprises a magnet for engagement with a metal portion of the magnetic restraining assembly such as an inner or outer washer.

20. The closing mechanism according to claim 18 wherein there are nodes within the cable retractor that upon rotation of the cable retractor push a pawl of the lever away from the node locating the distal end of the lever into the disengaged position.

21. A sliding door comprising a closing mechanism according to claim 1.

22. A closing mechanism for closing a door, the closing mechanism comprising:

a housing which is adapted to be secured to the door, the housing houses a biasing assembly and a speed control assembly;

the biasing assembly has a cable spool for winding or unwinding a cable thereon, the cable is adapted to extend between the housing and a door jamb when the door is in an open condition, and the speed control assembly having a magnetic restraining assembly, the cable spool and the speed control assembly operatively interact to control the rotational speed of the cable spool, wherein the magnetic restraining assembly is adapted to affect the rotational movement of the cable spool to control the speed at which the door closes.

* * * * *